US011531909B2

(12) United States Patent
Okada et al.

(10) Patent No.: US 11,531,909 B2
(45) Date of Patent: Dec. 20, 2022

(54) COMPUTER SYSTEM AND METHOD FOR MACHINE LEARNING OR INFERENCE

(71) Applicant: ABEJA, Inc., Tokyo (JP)

(72) Inventors: Yousuke Okada, Tokyo (JP); Takanori Ogata, Tokyo (JP); Toshiya Kawasaki, Tokyo (JP); Takuma Teramoto, Tokyo (JP)

(73) Assignee: Abeja, Inc., Tokyo (JP)

( * ) Notice: Subject to any disclaimer, the term of this patent is extended or adjusted under 35 U.S.C. 154(b) by 464 days.

(21) Appl. No.: 16/627,695

(22) PCT Filed: Feb. 5, 2018

(86) PCT No.: PCT/JP2018/003824
§ 371 (c)(1),
(2) Date: Dec. 30, 2019

(87) PCT Pub. No.: WO2019/003485
PCT Pub. Date: Jan. 3, 2019

(65) Prior Publication Data
US 2020/0167671 A1    May 28, 2020

(30) Foreign Application Priority Data
Jun. 30, 2017  (JP) .............................. JP2017-128262

(51) Int. Cl.
*G06N 5/04*    (2006.01)
*G06N 20/00*   (2019.01)
*G06F 17/18*   (2006.01)

(52) U.S. Cl.
CPC .............. *G06N 5/04* (2013.01); *G06F 17/18* (2013.01); *G06N 20/00* (2019.01)

(58) Field of Classification Search
CPC ........... G06N 5/04; G06N 20/00; G06F 17/18
(Continued)

(56) References Cited

U.S. PATENT DOCUMENTS 9,058,317 B1    6/2015 Gardner et al.
10,705,796 B1 *  7/2020 Doyle ................... G06N 5/003
(Continued)

FOREIGN PATENT DOCUMENTS

JP    2015166975 A    9/2015
JP    2016062361 A    4/2016
(Continued)

OTHER PUBLICATIONS

Kashima, H., et al., Crowdsourcing and Machine Learning, Journal of Japanese Society for Artificial Intelligence, 27 (4), 2012, ISSN 0912-8085, chapters 2-3, pp. 381-338. (cited in the ISR).

(Continued)

*Primary Examiner* — William D Titcomb
(74) *Attorney, Agent, or Firm* — Procopio, Cory, Hargreaves & Savitch LLP

(57) ABSTRACT

The purpose of the present invention is to train a learning model and thereby create a utility model, and assist with an operation for making practical use thereof. Provided is a computer system 50 for preparing learning models in one or more learning units 102; receiving an input of learning data from a data source 111, and training said one or more learning models using the learning data. One or more utility models are finalized on the basis of said one or more trained learning models, and said one or more utility models are deployed to one or more inference units 114. Each of said one or more inference units 114: receives an input of utility data from the data source 111; provides the utility data to the utility models and executes an inference; and transmits, to a data target 113, inference result data outputted from the utility models.

18 Claims, 15 Drawing Sheets

(58) Field of Classification Search
USPC .......................................................... 706/12
See application file for complete search history.

(56) References Cited

U.S. PATENT DOCUMENTS

| | | | |
|---|---|---|---|
| 2002/0083025 A1* | 6/2002 | Robarts | G06F 21/6245 |
| | | | 706/12 |
| 2014/0321737 A1* | 10/2014 | Movellan | G06V 10/993 |
| | | | 382/159 |
| 2015/0254223 A1* | 9/2015 | Sakaki | G06F 40/169 |
| | | | 715/230 |
| 2015/0339572 A1* | 11/2015 | Achin | G06N 20/00 |
| | | | 706/46 |
| 2016/0086126 A1* | 3/2016 | Ashikawa | G06Q 10/063112 |
| | | | 705/7.14 |
| 2017/0041296 A1* | 2/2017 | Ford | G06F 21/64 |
| 2017/0178019 A1 | 6/2017 | Duggan et al. | |
| 2018/0060738 A1* | 3/2018 | Achin | G06N 20/00 |
| 2018/0060744 A1* | 3/2018 | Achin | G06N 5/04 |
| 2020/0257992 A1* | 8/2020 | Achin | G06N 20/10 |

FOREIGN PATENT DOCUMENTS

| | | |
|---|---|---|
| JP | 2016517052 A | 6/2016 |
| JP | 2016143354 A | 8/2016 |
| WO | 2015179778 A1 | 11/2015 |

OTHER PUBLICATIONS

Mizusawa, K., et al., Proposal for an Execution Plan Processing System for Crowdsourcing Environments, Mar. 2017 [retrieved: Jul. 6, 2017], Chapter 5, Chapter 6.4, Chapter 7, (DEIM Forum 2017), [online] URL: http://db-event. ipn.org/deim2017/papers/30.pdf.
International Search Report and Written Opinion for related PCT App No. PCT/JP2018/003824 dated May 15, 2018, 22 pgs.

* cited by examiner

COMPUTER SYSTEM AND METHOD FOR MACHINE LEARNING OR INFERENCE

CROSS-REFERENCE TO RELATED APPLICATIONS

This application is a U.S. National Stage entry of PCT Application No: PCT/JP2018/003824 filed Feb. 5, 2018, which claims priority to Japanese Patent Application No. 2017-128262, filed Jun. 30, 2017, the contents of which are incorporated herein by reference.

TECHNICAL FIELD

The present invention generally relates to at least one of machine learning and inference using a computer system.

BACKGROUND ART

In recent years, inference which uses a neural network configured to be practically usable has been used in image recognition, automated stock trading, automated translation, and the like. For example, PTL 1 discloses that training data which is images checked by experts can be applied to a neural network (hereinafter NN) (see paragraphs 0056 and 0058).

CITATION LIST

Patent Literature

[PTL 1]
Japanese Translation of PCT Application No. 2016-517052

SUMMARY OF INVENTION

Technical Problem

Generally, for many users, it is not easy to perform machine learning of NN appropriately according to the purpose of use and to deploy the NN having completed the machine learning on a computer and providing the same for practical use.

Such a problem may occur in a machine learnable computation model (that is, AI (Artificial Intelligence) in general) other than NN.

Solution to Problem

A computer system according to an aspect of the present disclosure includes: at least one physical computer including: at least one processor; at least one storage device capable of storing a command set executed by the at least one processor and storing data that can be processed by the at least one processor; and at least one interface connected to the at least one processor and at least one communication network, wherein the at least one processor is configured to execute: preparing one or more learning models; inputting learning data from at least one data source through the at least one interface to store the input learning data in the at least one storage devices; generating one or more learned models by performing machine learning of the one or more learning models using the learning data; determining at least one practical model on the basis of the one or more learned models; inputting practical data from at least one data source through the at least one interface; executing inference based on the at least one practical model using the practical data; and transmitting inference result data output from the at least one practical model by the inference to at least one data target through the at least one interface.

The computer system according to this aspect supports users performing an operation of performing machine learning of a learning model, preparing a practical model on the basis of the result of the machine learning, and providing the practical model for actual inference.

A computer system according to another aspect of the present disclosure includes: at least one physical computer including: at least one processor; at least one storage device capable of storing a command set executed by the at least one processor and storing data that can be processed by the at least one processor; and at least one interface connected to the at least one processor and at least one communication network, wherein the at least one processor is configured to execute: preparing one or more learning models; inputting at least one unit of learning data from at least one data source through the at least one interface to store the input learning data in the at least one storage device; transmitting the at least one unit of learning data to at least one annotator terminal through the at least one interface; receiving at least one annotation result related to each of the at least one unit of learning data from the at least one annotator terminal through the at least one interface; storing the received at least one annotation result in the at least one storage device in correlation with each of the at least one unit of learning data; and generating one or more learned models by performing the machine learning of the one or more learning models using the at least one unit of learning data and the at least one annotation result correlated therewith.

The computer system according to this aspect can support users performing an operation of preparing teaching data and performing machine learning of a learning model using the teaching data.

DESCRIPTION OF EMBODIMENTS

Hereinafter, an embodiment of the present invention will be described.

In the following description, an "interface unit" includes one or more interfaces. One or more interfaces may be one or more interface devices of the same type (for example, one or more NICs (Network Interface Cards)) and may be two or more interface devices of different types (for example, an NIC and an HBA (Host Bus Adapter)).

In the following description, a "storage unit" includes a memory and a storage. A storage includes one or more storage devices, and each storage device is typically a nonvolatile storage device (for example, an auxiliary storage device), and is an HDD (Hard Disk Drive) or an SSD (Solid State Drive), for example. A memory includes one or more storage devices, and each storage device may be a volatile storage device and may be a nonvolatile storage device.

Moreover, in the following description, a "processor unit" includes one or more processors. At least one processor is typically a CPU (Central Processing Unit). A processor may include a hardware circuit that performs a part or all of processes.

In the following description, a "program" is a set of commands that can be executed by a processor unit. A program (that is, a command set) is executed by a processor unit whereby various processes, control, or functions to be described later are performed while appropriately using a storage unit (for example, a memory) and/or an interface unit. Therefore, in the following description, although a process, control, or a function may be described using a program as a subject, the subject may be a processor unit (or an apparatus or a system having the processor unit). A program may be installed from a program source to a computer system. A program source may be a program distribution server or a computer-readable (for example, a non-transitory) recording medium. In the following description, two or more programs may be realized as one program, and one program may be realized as two or more programs. A program is typically stored in a storage of a computer system.

A "data set" is a cluster or a set of logical electronic data when seen from a program such as an application program and may be any one of a record, a file, a key/value pair, and a tuple, for example. A data set or the data of respective units included in the data set is typically stored in a storage of a computer system.

Figure 1:
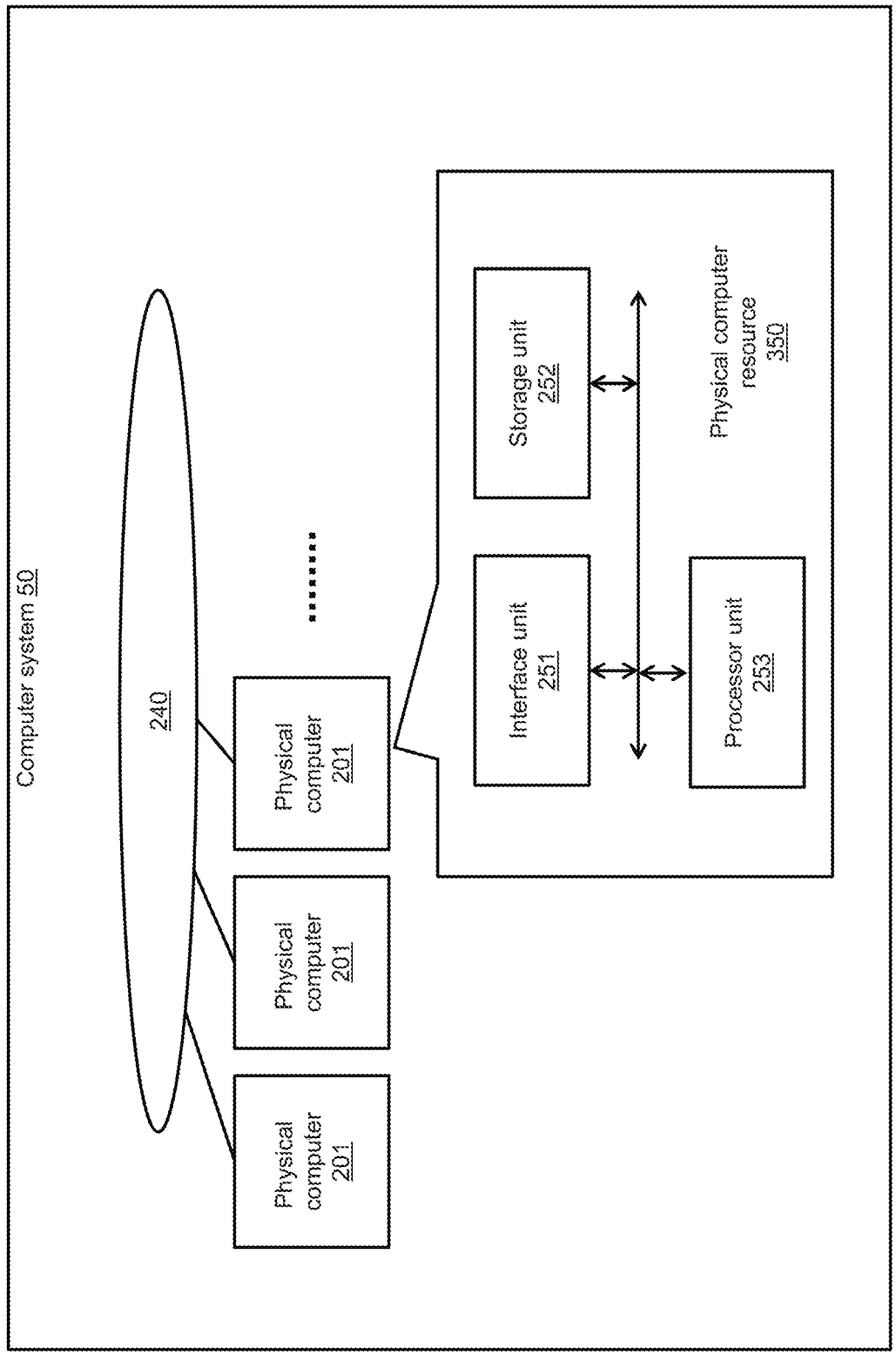
FIG. 1 illustrates a physical configuration of a computer system according to an embodiment of the present invention.

FIG. 1 illustrates a physical configuration of a computer system according to an embodiment of the present invention.

A computer system 50 includes a plurality of (or one) physical computers 201 connected to a network 240.

The network 240 is one or more communication networks and may include at least one of a FC (Fibre Channel) network and an IP (Internet Protocol) network, for example. The network 240 may be present outside the computer system 50.

Each physical computer 201 is a general-purpose computer, for example, and includes a physical computer resource 330. The physical computer resource 350 includes an interface unit 251 connected to the network 240, a storage unit 252, and a processor unit 253 connected to these components.

The computer system 50 may be a cloud computing system that provides XaaS (X as a Service), for example. "XaaS" generally means a service enabling any resources (for example, hardware, circuits, software execution environments, application programs, development environments, and the like) necessary for construction or operation of systems to be used through a network such as the Internet. A character (or a word) used as "X" of XaaS is different depending on the type (service model) of XaaS. Examples of XaaS include PaaS (Platform as a Service), SaaS (Software as a Service), IaaS (Infrastructure as a Service), and HaaS (Hardware as a Service).

Figure 2:
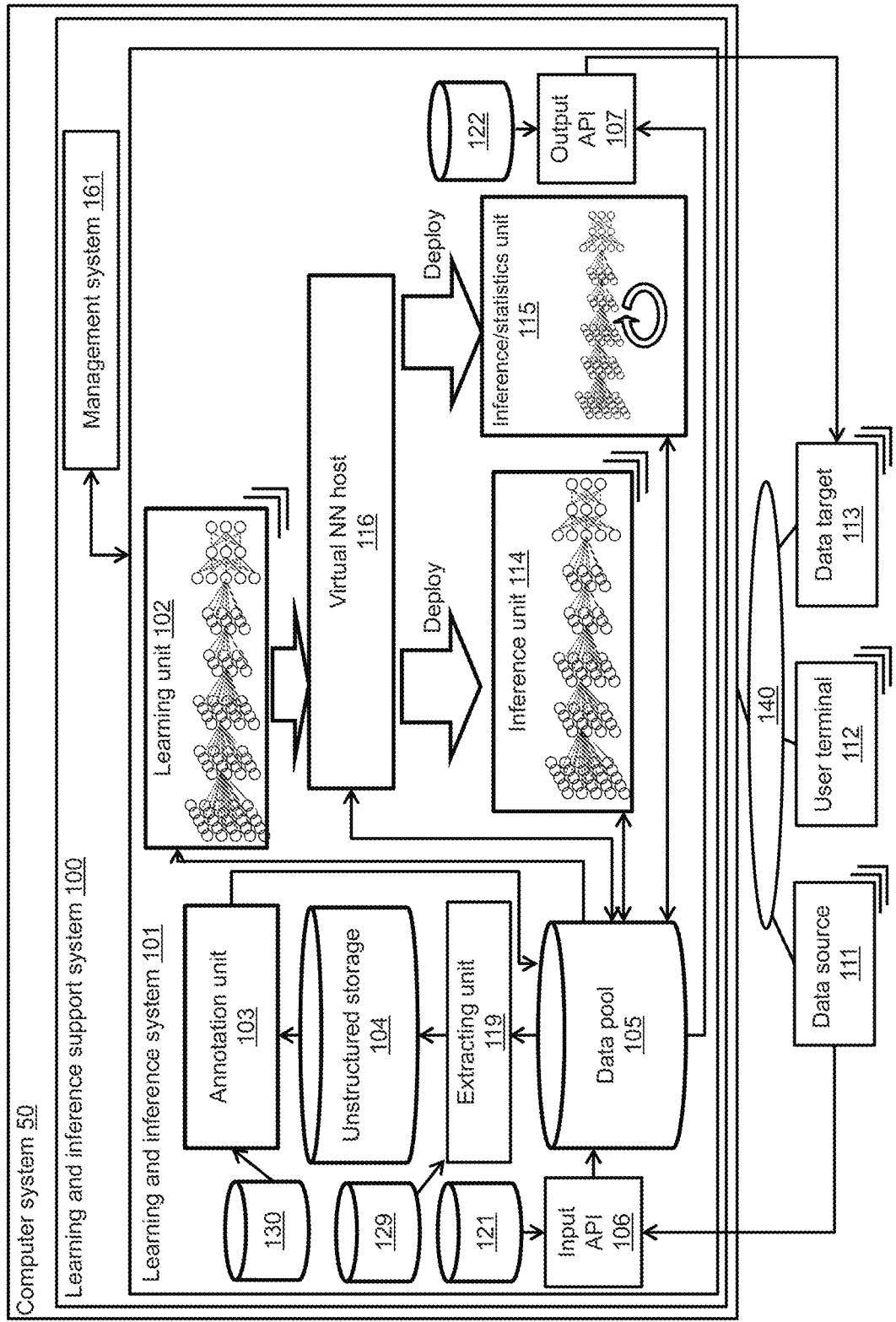
FIG. 2 illustrates a logical configuration of a computer system.

FIG. 2 illustrates a logical configuration of the computer system 50.

The computer system 50 provides a learning and inference support system 100 that supports at least one of learning and inference of one or more machine learnable computation models. Here, a "computation model" is a computation process performed by a computer (that is, a computation system realized on a computer). Although the computation model is an NN (Neural Network) in the present embodiment, the NN is one example only, and the computation model is not necessarily limited to the NN but may be another type of computation process or computation system. The learning and inference support system 100 may be a system realized on a cloud platform provided by the computer system 50, for example. The learning and inference support system 100 includes a learning and inference system 101 and a management system 161 that manages the learning and inference system 101. The management system 161 may be a system that manages a system other than the learning and inference system 101.

The learning and inference system 101 is a system that performs machine learning (for example, deep learning) using one or more computation models (for example, NN) and inference using one or more machine-learned computation models (for example, NN). The learning and inference system 101 is connected to one or more data sources 111, one or more data targets 113, and one or more user terminals 112 through a network 140. The network 140 may be the network 240 and may be a network different from the network 240. The network 140 may be one or more communication networks.

The data source 111 is a source (reading source) of a data set. The data target 113 is a target (output destination) of a data set. The data source 111 and the data target 113 may be any one of a website, a network storage, and the user terminal 112, for example.

The user terminal 112 is a computer (client) used by a user. The user terminal 112 is used for instructing the learning and inference system 101 to perform learning and deployment, for example. The user terminal 112 may be a computer used by so-called a crowd-worker.

At least one of the data source 111, the data target 113, and the user terminal 112 may be a system (for example, a virtual computer) realized in the computer system 50.

The learning and inference system 101 includes an input API (Application Programming Interface) 106, input meta-information 121, a data pool 105, an extracting unit 119, extraction meta-information 129, an unstructured storage 104, an annotation unit 103, annotation meta-information 130, a learning unit 102, a virtual NN host 116, an inference unit 114, an inference/statistics unit 115, an output API 107, and output meta-information 122. At least one of the input API 106 (an example of an input unit), the extracting unit 119, the annotation unit 103, the learning unit 102, the virtual NN host 116, the inference unit 114, the inference/statistics unit 115, and the output API 107 (an example of an output unit) is one or more programs (in other words, a function realized when one or more programs are executed by a processor unit). Moreover, in the learning and inference system 101, two or more learning units 102 may be executed in parallel, and two or more inference units 114 may be executed in parallel. The number of at least one component among the components other than the learning unit 102 and the inference unit 114 may be two or more. The pieces of information including the input meta-information 121, the extraction meta-information 129, the annotation meta-information 130, and the output meta-information 122 are stored in one or more storage units 252 of the computer system 50. Moreover, a storage area including the data pool 105 and the unstructured storage 104 is a storage area provided by one or more storage units 252 of the computer system 50.

The input API 106 reads one or more data sets from one or more data sources 111 on the basis of the input meta-information 121 and stores the read data sets in the data pool 105.

The input meta-information 121 is information indicating the attribute of a data set to be read by the input API 106, and for example, includes a location in which a data set is stored and information indicating an identifier of a data set.

The data pool 105 is an example of a logical storage area in which a data set is stored. Specifically, the input API 106 stores the data set read from one or more data sources 111 in the data pool 105. Moreover, at least one of the inference unit 114 and the inference/statistics unit 115 may store a data set as an inference result in the data pool 105. A structured data set and an unstructured data set may coexist in the data pool 105. Here, structured data refers to data which already includes such a meaning that can be processed statistically by a computer, such as POS (Point Of Sales) data indicating such information that "sales sum of item A is B" or weather data indicating such information that "weather of region A is B", for example. On the other hand, unstructured data refers to data which does not include such a meaning that can be processed statistically by a computer, such as a simple image, a text, or an audio, for example.

The extracting unit 119 extracts an unstructured data set from the data pool 105 on the basis of the extraction meta-information 129 and stores the unstructured data set in the unstructured storage 104.

The extraction meta-information 129 is information indicating the attribute of an unstructured data set to be extracted by the extracting unit 119 and includes information indicating an identifier of the unstructured data set, for example. The unstructured data set to be extracted is an unstructured data set for learning and verification, and for example, is a picture image file in which an animal such as a dog or a cat is photographed. The extraction meta-information 129 may include information indicating an extraction target attribute for respective purposes of use of a user.

The unstructured storage 104 stores the unstructured data set extracted by the extracting unit 119. Meta-information (for example, meta-information extracted from the extraction meta-information 129) which is likely to be correlated with the unstructured data set is added to the stored unstructured data set by the extracting unit 119 as probability information (probability). A set of data (learning data) to be input to the NN in the machine learning of the learning unit 102 among the unstructured data sets stored in the unstructured storage 104 will be referred to as a "learning data set".

The respective pieces of learning data included in the learning data set are correlated with the annotation results by the annotation unit 103. The learning data and the annotation results correlated therewith are referred to as "teaching data" and a set of teaching data is referred to as "teaching data set". Learning data may be unstructured data such as, for example, simple image data, audio data, or text data and may be structured data which are already assigned with certain meanings such as POS data.

The annotation unit 103 controls an operation (hereinafter referred to as an "annotation operation") of correlating annotation results with a learning data set. Specifically, for example, the annotation unit 103 performs the following operations on the basis of the annotation meta-information 130.

The annotation unit 103 transmits a request for the input (an annotation operation) of annotation results (for example, labels indicating classification names of respective pieces of learning data) of the learning data set in the unstructured storage 104 to the user terminal 112.

The annotation unit 103 receives the annotation results of the learning data set from the user terminal 112 having received the request.

The annotation unit 103 correlates the received annotation results with the learning data set.

The annotation unit 103 stores the learning data set (teaching data set) correlated with the annotation results in the data pool 105.

More specifically, for example, the annotation unit 103 automatically transmits a request for the input of annotation results of a learning data set to the user terminal 112 of a crowd-worker periodically or non-periodically (for example, an email or a message including a link to a webpage for inputting annotation results is transmitted). Learning data (for example, one or more picture images in which a dog or a cat is photographed), a question related to the learning data (for example, an animal in each picture image is a dog or a cat?), and a webpage displaying an input UI (User Interface) for inputting an annotation result (for example, a label of "dog" or "cat") as an answer to the question are provided to the user terminal 112 having received the request. The content of the webpage may be determined on the basis of the annotation meta-information 130. The annotation unit 103 correlates the annotation result input from the user terminal 112 via the webpage with the corresponding learning data. The annotation unit 103 stores the learning data (teaching data) correlated with the annotation result in the data pool 105. In this manner, for each piece of the learning data of belonging to the learning data set, an annotation result is created and correlated therewith.

The annotation meta-information 130 is information including information on the control of operation of the annotation unit 103. The annotation meta-information 130 may include the information on the control of operation of the annotation unit 103 for each purpose of use of the user.

The learning unit 102 prepares at least one NN (hereinafter referred to as a "learning NN" or more generally a "learning model") on which machine learning is to be performed. The learning unit 102 performs machine learning (that is, training (hereinafter referred to as a "learning process")) of the learning NN. That is, the learning unit 102 reads a teaching data set from the data pool 105 on the basis of learning meta-information (for example, information including information indicating the attribute of a reading target teaching data set), supplies the read teaching data set to the learning NN, and trains the learning NN so as to approach a more optimal one. In the present embodiment, a plurality of learning units 102 can operate in parallel, and the plurality of learning units 102 can train a plurality of different learning NNs. The plurality of learning NNs may include a plurality of learning NNs of which the purposes of use and the configurations both are the same, may include a plurality of learning NNs of which the purposes of use are the same but the configurations are different, and may include a plurality of learning NNs of which the purposes of use and the configurations are different. Although the learning meta-information is defined in the learning unit 102, the learning meta-information may be present outside the learning unit 102 instead of this. A learning NN (hereinafter referred to as a "learned NN") on which the machine learning in the learning unit 102 is completed is stored as a library by the virtual host NN 116 (for example, stored in a predetermined storage area).

The virtual NN host 116 performs a verification process of calculating output accuracy of each learned NN. The virtual NN host 116 selects one or more learned NNs as an NN to be provided for practical use (hereinafter referred to as a "practical NN" or more generally a "practical model") according to a predetermined rule on the basis of the results of the verification process. For example, when there are a plurality of learned NNs having the same purpose of use, one learned NN having the highest output accuracy is selected as a practical NN among these learned NNs. A learned NN selected as the practical NN among one or more libraries of learned NNs is deployed to the inference unit 114 or the inference/statistics unit 115 according to the purpose of use and is provided for practical use.

The practical NN deployed to the inference unit 114 is an NN model for performing inference (for example, identifying the type of an animal from a picture image of the animal) of a specific purpose which mainly receives unconstructed data as an input. The inference unit 114 executes the practical NN deployed thereto to thereby perform an inference process of the specific purpose. For example, the inference unit 114 reads a data set for the inference purpose (hereinafter referred to as a "practical data set", and for example, a data set of a picture image in which an animal is photographed) from the data pool 105 on the basis of inference meta-information (not illustrated) (for example, an example of APP meta-information to be described later including information indicating the attribute of a reading target data set), inputs the practical data set to the practical NN to obtain output data (for example, an answer that "dog" is photographed in the picture image) from the practical NN, and stores a set of the output data (hereinafter referred to as a "inference result data set") in the data pool 105. The inference meta-information is present in the inference unit 114 as will be described later. Two or more inference units 114 are executed in parallel.

The practical NN deployed to the inference/statistics unit 115 is an NN model for performing an inference or statistic process of a specific purpose which mainly receives inference result data and/or structured data as an input. The inference/statistics unit 115 performs at least one of an inference process and a statistic process using the practical NN deployed thereto. Specifically, for example, the inference/statistics unit 115 refers to inference/statics meta-information (not illustrated). The inference/statics meta-information includes, for example, information indicating the attribute of a reading target data set (for example, an inference result data set and a structured data set), and information indicating a relationship between the inference result data set and a structured data set indicating values correlated with the inference result data set. The inference/statistics unit 115 reads the inference result data set and/or the structured data set on the basis of inference/statics meta-information and stores the inference result data set correlated with the values indicated by the structured data set in the data pool 105 as an inference/statistics result data set.

The output API 107 reads an output target data set (typically, an inference result data set or an inference/statistics data set) from the data pool 105 on the basis of the output meta-information 122 and outputs the read data set to the output destination data target 113 specified from the output meta-information 122. The output meta-information 122 is information indicating the attribute of the data set to be read by the output API 122 and an output destination of the data set and includes, for example, information indicating a relationship between a data set ID and a key and information indicating a relationship between an output destination and a key.

Hereinabove, a logical configuration of the computer system 50 has been described.

In the learning and inference system 101, the learning unit 102, the inference unit 114, and the inference/statistics unit 115 are provided, a learned NN selected as a practical NN among the learned NNs on which machine learning in the learning unit 102 has been completed is automatically deployed to a vacant inference unit 114 or inference/statistics unit 115, and the inference unit 114 or the inference/statistics unit 115 performs an inference process using the practical NN. That is, as long as a learning data set or a practical data set corresponding to the purpose of use of a user is input to the learning and inference system 101, a learning NN or a practical NN matching the purpose of use is used. Therefore, for users, it is easy to prepare an executable NN (or a computation model) corresponding to the purpose of use and apply the same in a practical way.

In the learning and inference system 101, a plurality of data sets (for example, including data sets as intermediate results) of which the purposes of use and the processing methods are different, including the learning data set and the practical data set read by the input API 106, the teaching data set (the learning data set correlated with the set of annotation results) obtained by the annotation unit 103, the inference result data set output from the inference unit 114, and the inference/statistics result data set obtained from the inference/statistics unit 115 are collected in the data pool 105. Since a plurality of data sets are collected in one location in this manner, the convenience of a process such as analysis (for example, the process performed by the inference/statistics unit 115) is improved. However, it is not essential to collect the plurality of data sets in such one storage area as the data pool 105. The plurality of data sets may be distributed to a plurality of different storage areas.

Moreover, the inference/statistics unit 115 may be not present. In this case, an inference result data set (a data set that is not correlated with the values indicated by the structured data set) may be output from the output API 107 to the data target 113.

Hereinafter, the details of deployment of a practical NN to the inference unit 114 (or the inference/statistics unit 115) will be described.

Figure 3:
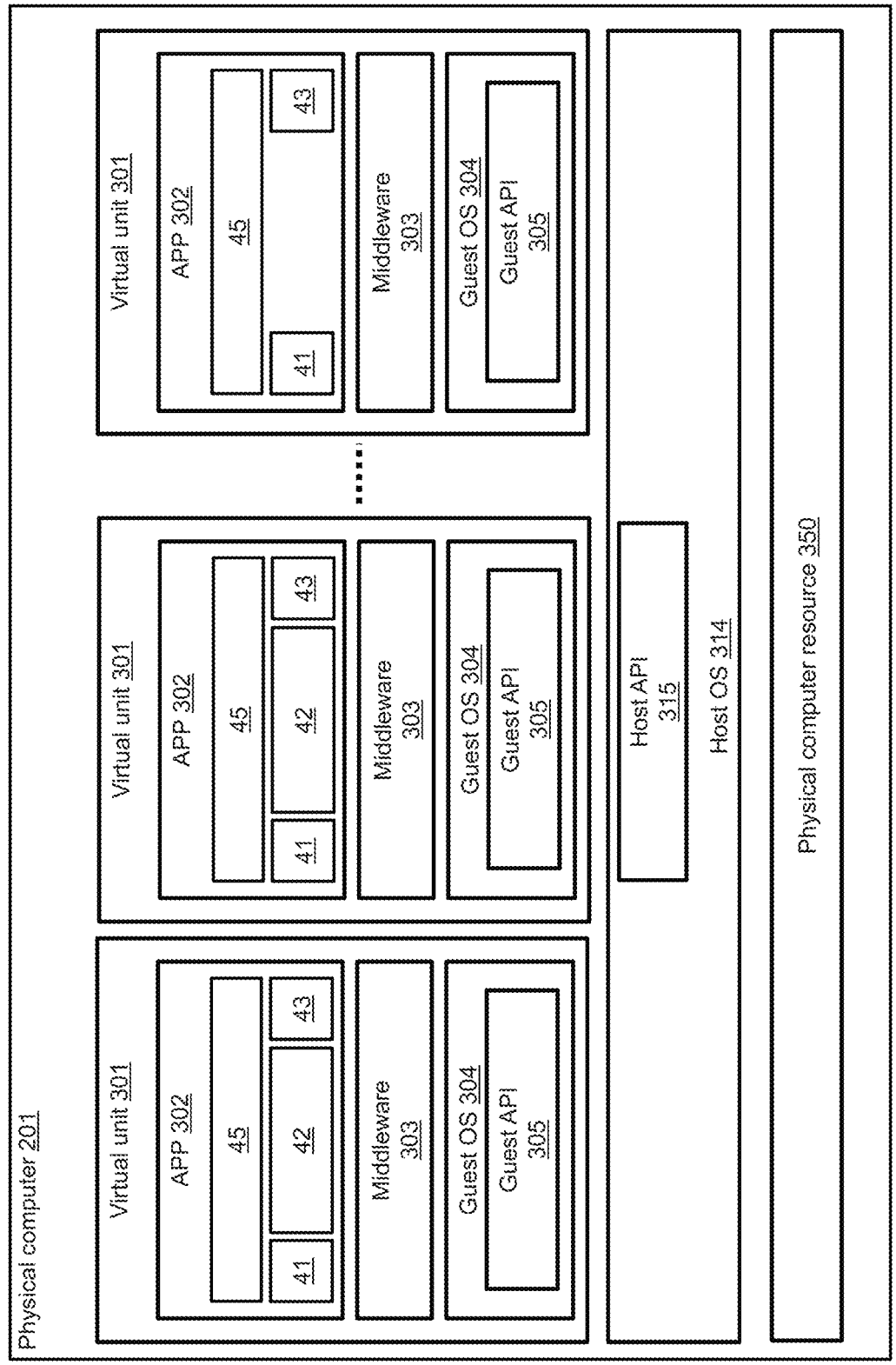
FIG. 3 illustrates a logical configuration of at least one physical computer.

FIG. 3 illustrates a logical configuration of the physical computer 201. The physical computer 201 illustrated in FIG. 3 is one of all or some physical computers 201 in the computer system 50, and each of the physical computers 201 has the logical configuration illustrated in FIG. 3.

A host OS (Operating System) 314 is executed on a physical computer resource 350 included in the physical computer 201. A plurality of virtual units 301 is executed on the host OS 314. The host OS 314 is a common OS for the plurality of virtual units 301, the host OS 314 may be referred to a "common OS 314".

The virtual unit 301 is a virtual execution environment and, for example, may be a virtual computer and may be an execution environment called a container (for example, a container operating on the Linux OS (here, Linux is a registered trademark)). In the present embodiment, although one virtual unit 301 is present for one APP (application program) 302, two or more APPs 302 may be present for one virtual unit 301.

The guest OS 304 is executed in the virtual unit 301. Since the guest OS 304 is present for one virtual unit 301 and is an OS in the virtual unit 301, the guest OS 304 may be referred to as an "internal OS 304". Middleware 303 is executed on the guest OS 304, and the APP 302 is executed on the middleware 303. There may be a virtual unit 301 without the middleware 303, and in such a virtual unit 301, the APP 302 is executed on the guest OS 304.

In each virtual unit 301, the APP 302 has an input module 41, an output module 43, and a control module 45 in advance. As will be described later, a main module 42 including a practical NN is dynamically deployed (that is, dynamically incorporated) to the APP 302. In other words, in an initial state in which the APP 302 is prepared, the main module 42 is not incorporated in the APP 302. The APP 302 in which the main module 42 is not present will be referred to as a "vacant APP 302", and the virtual unit 301 having the vacant APP 302 will be referred to as a "vacant virtual unit 301". The main module 42 including the practical NN can be deployed frequently (that is, incorporated frequently) to the vacant APP 302 of the vacant virtual unit 301. The APP 302 in which the main module 42 is deployed (incorporated) will be referred to as an "occupied APP 302", and the virtual unit 301 having the occupied APP 302 will be referred to as an "occupied virtual unit 301".

The host OS 314 has a host API 315. In each virtual unit 301, the guest OS 304 has a guest API 305. Hereinafter, an address of the host API 315 in each physical computer 201 will be referred to as a "host address" and an address of the guest API 305 in each virtual unit 301 will be referred to as a "guest address". The host address and the guest address are IP (Internet Protocol) addresses, for example. The management system 161 (see FIG. 2) manages the guest address as well as the host address for each physical computer 201.

In the present embodiment, in at least one physical computer 201, a plurality of vacant virtual units 301 are provided initially on the host OS 314 operating on the physical computer resource 350. The number of virtual units 301 on the host OS 314 may be dynamically increased or decreased (for example, the number of virtual units 301 may be increased or decreased according to the load of the physical computer resource 350). However, in the present embodiment, the number of virtual units 301 in the physical computer 201 is determined in advance on the basis of the physical computer resource 350 in the physical computer 201. Since a plurality of vacant virtual units 301 are prepared initially in one physical computer 201, restarting the physical computer 201 is not necessary even when the number of occupied virtual units 301 changes within the range of the number of virtual units prepared initially (that is, even when the main module 42 is deployed to any one of the plurality of vacant virtual units 301 provided initially or the deployed main module 42 is erased or replaced with another main module 42). Therefore, in an environment in which a plurality of virtual units 301 of the same physical computer 201 are used by a plurality of users (for example, companies), it is possible to avoid stopping of a service (a service provided by the APP 302) for any users.

Each of the inference units 114 (and the inference/statistics units 115) corresponds to one occupied virtual unit 301 (one occupied APP 302). The number of inference units 114 may be increased dynamically. That is, a new practical NN may be generated and is deployed to a vacant virtual unit 301 whereby a new inference unit 114 may be created. Moreover, although each of the learning units 102 may correspond to one occupied virtual unit 301 similarly, instead of this, each learning unit 102 may be a program installed in advance in a certain physical computer 201. Moreover, although at least one program (for example, at least one of the input API 106, the output API 107, the virtual NN host 116, and the management system 161) other than the inference unit 114 and the learning unit 102 may correspond to one occupied virtual unit 301, instead of this, the program may be a program installed in advance in a certain physical computer 201. Furthermore, for example, the virtual NN host 116 may be at least a part of the host OS 314 of the physical computer 201.

Figure 4:
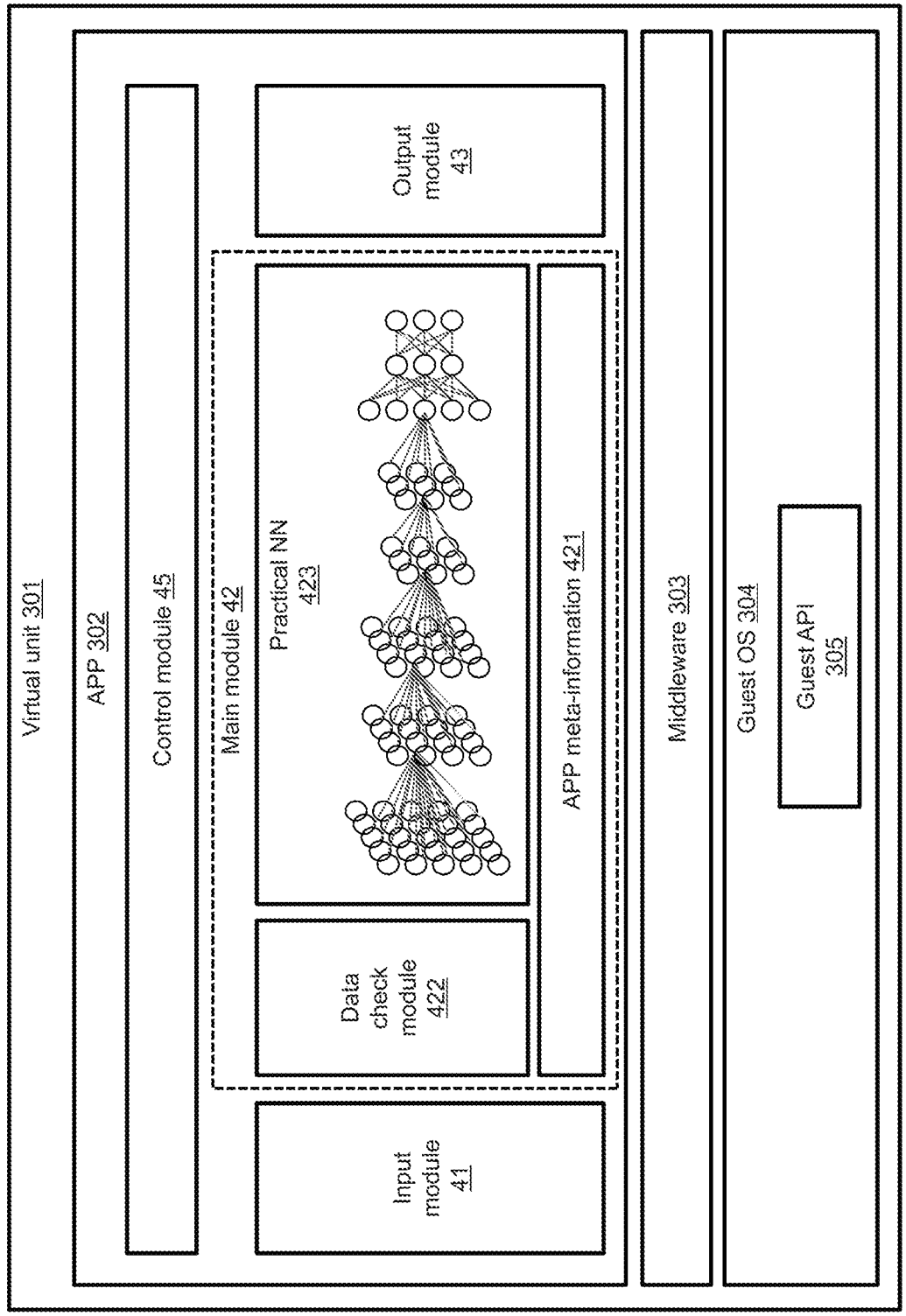
FIG. 4 illustrates the details of a configuration of a virtual unit.

FIG. 4 illustrates the details of the configuration of the virtual unit 301.

As described above, in the virtual unit 301, the middleware 303 is executed on the guest OS 304, and the APP 302 is executed on the middleware 303.

The APP 302 has an input module 41, an output module 43, and a control module 45 in advance (that is, in the state of a vacant APP 302). The main module 42 is dynamically incorporated in the APP 302 or is removed therefrom. As described above, the APP 302 in which the main module 42 is not incorporated is referred to as a vacant APP 302, and the APP 302 in which the main module 42 is incorporated is referred to as an occupied APP 302. The main module 42 includes APP meta-information 421, a data check module 422, and a practical NN 423.

The input module 41, the output module 43, and the control module 45 are defined in advance as a general-purpose module of which the structure does not depend on the content (that is, the configuration and the attribute of the practical NN) of the main module 42. That is, the input module 41, the output module 43, and the control module 45 are examples of two or more general-purpose modules. Another general-purpose module may be prepared instead of or in addition to at least one general-purpose module.

The input module 41 reads a practical data set from a storage area (for example, a storage area in the data pool 105) on the basis of the APP meta-information 421 and supplies the read practical data set to the main module 42. The target data set to be read, a source storage area from which the practical data set is read, and a destination to which the read practical data set is supplied are specified from the APP meta-information 421.

The output module 43 outputs (stores) the inference result data set output from the main module 42 (the practical NN 423) in a storage area (for example, a storage area in the data pool 105) on the basis of the APP meta-information 421. The destination storage area to which the data set is output is specified from the APP meta-information 421.

The control module 45 communicates with an external component (for example, the guest OS 304) of the APP 302.

The APP meta-information 421 is meta-information related to operations of the APP 302 and includes at least one of the following pieces of information, for example.

Parameters set in a predefined module such as the input module 41, the output module 43, and the control module 45. That is, parameters set in the input module 41, parameters set in the output module 43, and parameters set in the control module 45. The input module 41, the output module 43, and the control module 45 operate according to the parameters set on the basis of the APP meta-information 421. The parameters may be set by the input module 41, the output module 43, and the control module 45 and may be set by the control module 45.

Information indicating the attribute of the target practical data set to be read by the input module 41 (for example, an ID (for example, a file name) of the data set and an address of a reading source area (for example, LBA (Logical Block Address))). In other words, information related to an access right of the practical data set.

Information indicating the attribute of an output destination of an inference result data set output by the output module 43 (for example, an address (for example, LBA) of an output destination area).

Information indicating the attribute of the practical NN 423 (for example, an ID of the practical NN 423, an address (for example, LBA) of a reading source area of the practical NN 423, and an input dimension and an output dimension of the practical NN 423).

Information indicating the attribute of the data check module 422 (for example, an ID of the data check module 422 and an address (for example, LBA) of a reading source area of the data check module 422).

Parameters which are set in the data check module 422 and which correspond to the practical NN 423 (for example, information indicating the attribute (for example, a dimension of a data set or an error pattern) of an input checking target data set).

The APP meta-information 421 including the above-described pieces of information is present in the APP 302 (the main module 42). That is, all (or at least some) of the pieces of information necessary for operating the practical NN 423 are included in the APP 302. The practical NN 423 can be operated by allowing the input module 41, the output module 43, and the control module 45 configured as a general-purpose module which does not depend on the practical NN 423 to use the APP meta-information 421.

The data check module 422 checks whether the practical data set input from the input module 41 is the same data set (that is, a correct data set) as the information defined during deployment of the main module 42 on the basis of the APP meta-information 421 (for example, according to the parameters set on the basis of the APP meta-information 421). When the checking result is True, the data check module 422 inputs the practical data set to the practical NN 423. In this way, it is possible to prevent a wrong data set from being input to the practical NN 423 and prevent occurrence of errors. The data check module 422 may not be essential.

The practical NN 423 receives the input of a practical data set from a storage area outside the virtual unit 301 through the input module 41 and outputs an inference result data set (or an inference/statistics result data set). The output inference result data set is written to a storage area outside the virtual unit 301 through the output module 43.

In this manner, in the present embodiment, the APP 302 is executed on the middleware 303 (the guest OS 304) in the virtual unit 301. The plurality of functions of the APP 302 are configured as the modules 41, 422, 423, 43, and 45, and the respective modules 41, 422, 423, 43, and 45 are sub-application programs. That is, the APP 302 is so-called a loosely-coupled APP. Specifically, the input module 41, the output module 43, and the control module 45 are prepared in advance as the functional modules other than the main module 42 including the practical NN 423. In this way, versatility is guaranteed. In the APP 302, the input module 41, the output module 43, the control module 45, the data check module 422, and the practical NN 423 are sub-application programs called a "microservice". As long as a practical NN 423 of any configuration is deployed to the APP 302 as one sub-application program, input and output of data between the practical NN 423 and a component outside the virtual unit 301 is performed by the input module 41 and the output module 43. Therefore, it is easy to create a state in which the practical NN 423 can be executed. Specifically, when the configuration of the practical NN 423 is updated, for example, a new main module 42 including the practical NN 423 after updating may be overwritten to the main module 42 including the old practical NN 423 and may be deployed to another vacant virtual unit 301 (a vacant APP 302). Therefore, putting the practical NN 423 after updating into an executable state (and replacing or adding of the practical NN 423) can be realized without restarting the physical computer 201.

A configuration in which a virtual unit is not necessary may be considered as a first comparative example. In this case, a learning unit deploys a practical NN on the basis of environment information (for example, information including information related to an input source, information indicating the range of a data set to be input, and information indicating the format (for example, the number of dimensions) of a data set to be input). However, in the first comparative example, it is necessary to perform setting of a process (for example, process B is performed if an inference result is A) accompanied by an inference result for each practical NN, and a deployment cost is high. Moreover, it is necessary to restart a physical computer whenever a new practical NN is deployed. While a physical computer is restarted, a service provided by an APP executed by the physical computer is stopped.

A configuration in which, although a virtual unit is employed, a closely-coupled APP (an APP in which a practical NN and another function (for example, data input/output, control, and the like) are integrated) is employed, and the virtual NN host is not present may be considered as a second comparative example. In this case, the learning unit defines a virtual unit including an APP integrated with the practical NN and sets the virtual unit. However, in the second comparative example, when it is necessary to update a certain practical NN, it is necessary to replace or add the entire APP integrated with the practical NN. As a result, it is necessary to replace or add a virtual unit corresponding to the APP in one-to-one correspondence. Therefore, similarly to the first comparative example, it is necessary to restart the physical computer. Moreover, when a virtual unit goes down, a new virtual unit serving as a deployment destination of the APP in the virtual unit is added, and the physical computer is restarted.

A configuration having a common instance for two or more inference units may be considered as a third comparative example. In this case, the instance reads all inference data sets and inputs these inference data sets to two or more inference units. Therefore, if the instance goes down, any inference unit cannot continue an inference process. Moreover, since the instance reads and inputs the inference data set regardless of the state of an inference unit, an error may occur in the inference unit. When an error occurs in the inference unit, the instance stops reading the inference data set in order to perform error handling. Therefore, the inference process of each inference unit stops.

According to the present embodiment, as described above, since the APP 302 is so-called a loosely-coupled APP having functional modules, it is possible to replace or add the practical NN 423 without restarting the physical computer 201.

According to the present embodiment, the learning unit 102 does not define the virtual unit including an APP integrated with the practical NN, but the APP meta-information 421 included in the APP 302 and the data check module 422 and the practical NN 423 based on the APP meta-information 421 are deployed to the virtual unit 301 which is being hosted.

According to the present embodiment, as described above, the number of virtual units 301 operating on the physical computer 201 is a fixed number of 2 or more in an initial state (for example, the number is the maximum number determined in advance on the basis of the physical computer resource 350). The practical NN 423 can be replaced or added within the range of the initial number of virtual units 301 without restarting the physical computer 201.

In the virtual unit 301, each module in the APP 302 is a sub-application program. Therefore, even when an error occurs in another virtual unit 301, the virtual unit 301 can continue to perform operations.

However, so-called a loosely-coupled APP (that is, a general-purpose APP) may have a lower performance than so-called a closely-coupled APP (that is, a specific-purpose APP). This is because inter-module communication (for example, API-based communication) occurs in a loosely-coupled APP.

Therefore, in the present embodiment, as illustrated in FIGS. 3 and 4, the host API 315 (host address) is provided in the host OS 314, and the guest API 304 (guest address) is provided in the guest OS 304 of each virtual unit 301. The host address and the guest address are managed by the management system 161. In the management system 161, the guest address is a personal address (for example, an address determined independently by a user). Therefore, since access which uses a guest address as an end point of the access is possible (that is, routing by a host API is not necessary), it is possible to suppress decrease in performance of the entire learning and inference support system 100. The management system 161 can manage the virtual units 301 using the guest address regardless of which physical computer 201 (or the host OS 314) is the physical computer 201 (or the host OS 314) on which the virtual unit 301 operates.

In the present embodiment, the guest OS 304 (and the middleware 303) is present independently for respective APPs 302. The respective APPs 302 (virtual units 301) can operate independently on the same physical computer resource 350. In other words, each APP 302 (and the virtual unit 301) does not need to communicate with other APP 302 (other virtual unit 301) in order to realize the operation of the APP 302 (and the virtual unit 301). Similarly, each physical computer 201 (the host OS 314) does not need to communicate with other physical computer 201 (other host OS 314) in order to realize the operation of the physical computer 201 (the virtual unit 301).

The management system 161 may be a system including a management unit and a monitoring unit. The management unit manages the learning and inference system 101. The monitoring unit monitors the learning and inference system 101. The "management" performed by the management system 161 may include "management" by the management unit and "monitoring" by the monitoring unit.

For example, the management refers to or updates virtual unit management information (not illustrated). The virtual unit management information is stored in the storage unit 252 of at least one physical computer 201. The virtual unit management information includes, for each a management information target guest address (that is, for each management target virtual unit 301), a physical computer ID, a host address, a main module attribute (for example, a practical NN ID), and a status (for example, "standby" meaning a vacant state, "active" meaning that the main module 42 is present, and "error" meaning occurrence of an error). The management unit can specify which virtual unit 301 of which physical computer 201 is a vacant virtual unit 301 by referring to the virtual unit management information.

For example, the management unit keeps each physical computer 201 having vacant virtual units 301 at a predetermined vacancy ratio or more. In this way, even when an error virtual unit 301 to be described later is generated, it is guaranteed that at least one recovery destination is present. The "vacancy ratio" is the ratio of the number of vacant virtual units 301 with respect to the number of virtual units 301 in the physical computer 201.

For example, when a vacancy ratio of a certain physical computer 201 reaches a predetermined vacancy ratio or more, the management unit adds a new physical computer 201 (for example, instructs a predetermined system to add the physical computer 201) and arranges a predetermined number (for example, a largest number) of vacant virtual units 301 in the new physical computer 201. The vacant virtual unit 301 in the new physical computer 201 can be a deployment destination of the practical NN 423.

The monitoring unit refers to virtual unit monitoring information (not illustrated), for example. The virtual unit management information is stored in the storage unit 252 of at least one physical computer 201. The virtual unit monitoring information includes a physical computer ID and a host address for each monitoring target guest address (that is, for each monitoring target virtual unit 301). The monitoring unit monitors the monitoring target virtual unit 301 on the basis of the virtual unit monitoring information. The monitoring unit performs recovery upon detecting that an error had occurred in any virtual unit 301. Specifically, for example, the monitoring unit notifies the monitoring unit of the guest address of an error virtual unit 301 (a virtual unit 301 in which an error has occurred). Upon receiving the notification, the monitoring unit refers to the virtual unit management information, determines a recovery destination vacant virtual unit 301, and determines that the same main module 42 as the main module 42 (the practical NN 423) in the error virtual unit 301 is to be deployed to the determined vacant virtual unit 301 (for example, transmits a meta-setting instruction (an instruction designating the guest address of the recovery destination virtual unit 301) of the APP meta-information 421 in the same main module 42 to the recovery destination vacant virtual unit 301). The recovery destination vacant virtual unit 301 may be any of the following vacant virtual units. It can be expected that the time required for recovery (the time required until the same practical NN 423 as the practical NN 423 in the error virtual unit 301 enters an executable state) is short if the recovery destination vacant virtual unit 301 is (A) among the following vacant virtual units.

(A) Any vacant virtual unit 301 in the physical computer 201 in which the error virtual unit 301 is present.

(B) Any vacant virtual unit 301 in the physical computer 201 having the smallest vacancy ratio.

As described above, the virtual unit 301 actively reads a data set. That is, the virtual unit 301 (for example, the control module 45) can perform speed handling.

Figure 5:
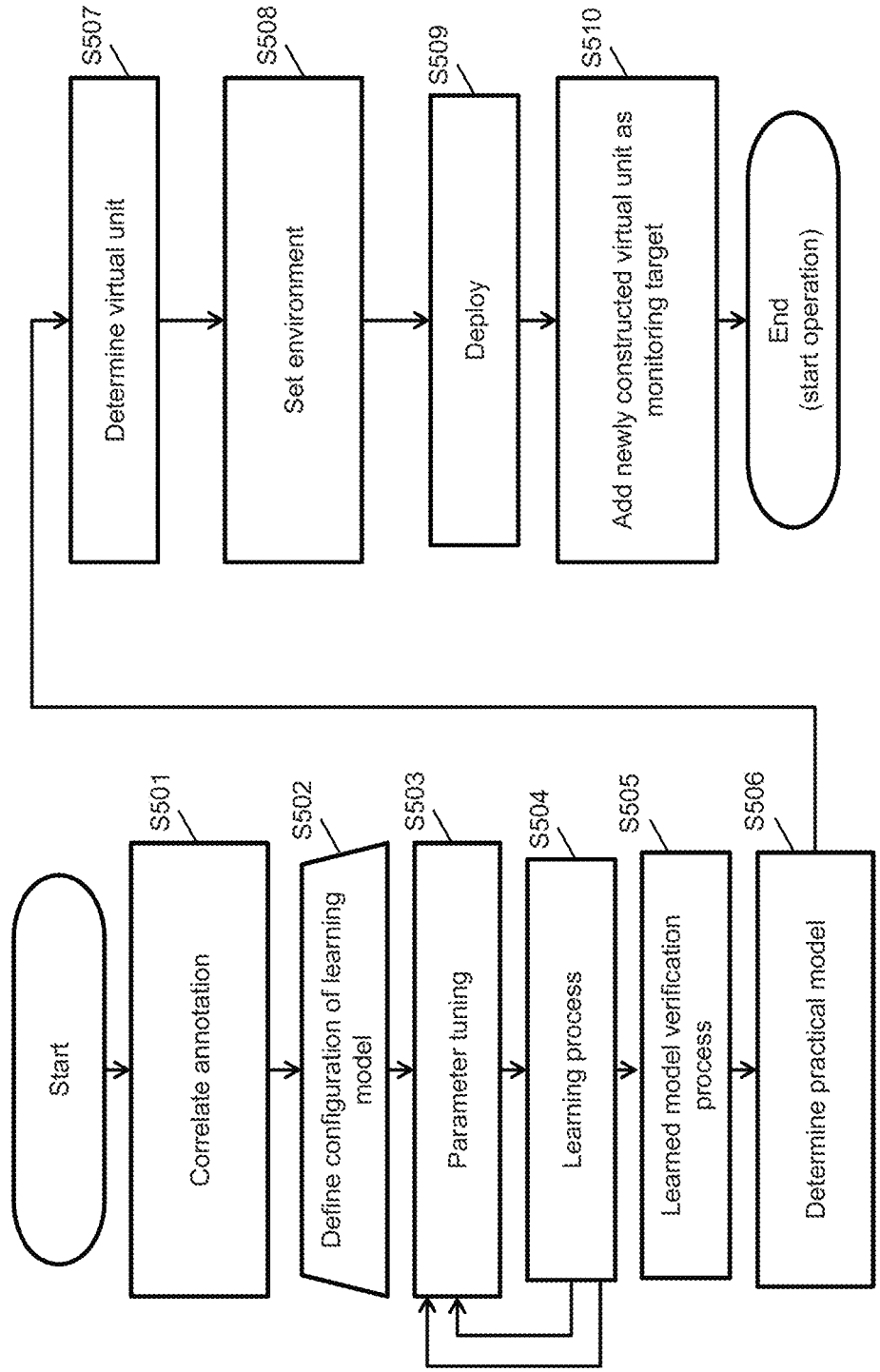
FIG. 5 illustrates the flow of an entire process related to generation and deployment of a practical NN (Neural Network) corresponding to the purpose of use.

Hereinafter, the flow of an entire process related to generation and deployment of a practical NN corresponding to a certain purpose of use will be described with reference to FIG. 5.

In S501, the annotation unit 103 stores a teaching data set (a data set including a learning data set and an annotation result correlated with the learning data set) corresponding to the purpose of use in the data pool 105 on the basis of the annotation meta-information 130. Specifically, for example, the annotation unit 103 automatically transmits a request to input annotation results (for example, answers) of the learning data set to a number of user terminals 112 of crowdworkers. The annotation unit 103 correlates the annotation results input from the user terminals 112 with the learning data set in response to the request and stores the learning data set (teaching data set) correlated with the annotation results in the data pool 105. In this way, generation (correlation of the annotation results with the learning data set) of the teaching data set is performed in response to the request transmitted automatically by the annotation unit 103.

In S502, a user (for example, an AI engineer) defines a configuration (for example, the number of layers of NN, the format and the number of dimensions of each layer, and the format and the parameter sets of each interlayer function) of at least one learning NN (learning model) corresponding to the purpose of use. The defined configuration of the learning NN is set in the storage area of the management system 161, for example. A plurality of learning NNs of which the purposes of use are the same and the configurations are different may be defined. In this case, a plurality of learning units 102 having the plurality of learning NNs may be prepared on one or more physical computers 201.

In S503, the parameter sets of each of the one or more learning NNs are tuned. Specifically, for example, first, the management system 161 initially sets the parameter sets of each learning NN. After that, the parameter sets of each learning NN are adjusted so as to approach more optimal ones on the basis of an output error of each learning NN obtained from the learning process of S504 below.

In S504, each of the one or more learning units 102 performs a learning process. That is, each learning unit 102 reads each piece of teaching data from the teaching data set of the data pool 105, inputs the learning data in the each piece of teaching data to each learning NN, and obtains output data from each learning NN. An error (that is, an output error of each learning NN) between the output data obtained from each learning NN and the annotation result within the piece of teaching data is obtained. The parameter tuning of S504 is performed again according to the output error. After that, another piece of the teaching data is read from the teaching data set and the processes of S504 and S503 which use the teaching data are repeated. When predetermined learning ending conditions (for example, the number of repetition times of the processes of S504 and S503 reaches a predetermined allowable number of times or the output error or a decrease rate thereof is an allowable value or smaller) are satisfied for each learning NN, machine learning of each learning NN ends.

In S505, the virtual NN host 116 stores one or more learning NNs (that is, learned NNs) in which machine learning has been ended in one or more learning units 102 and performs a verification process on the learned NNs. That is, the virtual NN host 116 calculates the accuracy of each of the learned NNs. Specifically, for example, the virtual NN host 116 inputs a learning data set of a teaching data set for verification to each learned NN and compares the output data set of each learned NN with the set of annotation results of the teaching data set. From the comparison result, the virtual NN host 116 calculates the accuracy of the learned NN (for example, the ratio of the number of pieces of output data of a correct answer to the total number of pieces of data of the teaching data set). The virtual NN host 116 evaluates the accuracy of each learned NN using a predetermined condition (for example, determines whether the accuracy of each learned NN is equal to or larger than a predetermined threshold).

When the evaluation result shows that all the learned NNs do not have deficient accuracy (for example, the accuracy is less than the threshold), the virtual NN host 116 notifies the management system 161 of the deficiency in accuracy. The management system 161 having received the notification of deficiency in accuracy causes each learning unit 102 to execute additional learning process and parameter tuning (S504 and S503) on all or some of the learning NNs having deficient accuracy.

When the evaluation result shows that the accuracy of at least one of the learned NNs is allowable (for example, the accuracy is equal to or larger than the threshold), in S506, the virtual NN host 116 selects at least one learned NN having the allowable accuracy as a practical NN. In this case, when a plurality of learned NNs for the same purpose of use has allowable accuracy, one learned NNs having the highest accuracy among the learned NNs may be selected as the practical model. The virtual NN host 116 transmits a determination notification including information (for example, the ID of NN) related to the practical NN 423 to the management system 161. In this way, the management system 161 recognizes which NN is the practical NN 423. Moreover, depending on the configuration of the practical NN 423, the data check module 422 correlated with the practical NN 423 is prepared by the management system 161 or the virtual NN host 116. In this case, additional machine learning may be performed on all or some of the learned NNs which have not been selected as the practical NN 423. Moreover, additional machine learning may be performed on those learned NNs selected as the practical NN 423.

In S507, when the management system 161 recognizes the practical NN 423, a vacant virtual unit 301 which will be a deployment destination of the practical NN 423 is selected or prepared automatically. For example, the management system 161 selects anyone of existing vacant virtual units 301 as the deployment destination or prepared a new vacant virtual unit 301 on the basis of the virtual unit management information. The management system 161 may determine the deployment destination vacant virtual unit 301 in response to an instruction from a user (for example, when information on the practical NN 423 is displayed and a deployment instruction is received as an approval of the practical NN 423).

In S508, the management system 161 performs environment setting of the deployment destination vacant virtual unit 301. Specifically, environment setting is performed as follows, for example.

The management system 161 generates APP meta-information 421 corresponding to the practical NN 423 and sets the APP meta-information 421 in the APP 302 in the deployment destination vacant virtual unit 301. Specifically, the management system 161 transmits a meta-setting instruction designating the guest address of the deployment destination vacant virtual unit 301 to the deployment destination vacant virtual unit 301. The meta-setting instruction is an instruction to set the APP meta-information 421. The meta-setting instruction is received by the guest OS 304 (the guest API 305) having the designated guest address through the host OS 314 (the host API 315) in the physical computer 201 having the vacant virtual unit 301. In response to the meta-setting instruction, the control module 45 in the APP 302 receives the instruction from the guest OS 304, and the control module 45 sets the APP meta-information 421 in the APP 302.

The management system 161 transmits an enabling instruction designating the guest address of the deployment destination vacant virtual unit 301. The enabling instruction is an instruction to set the parameters defined in the APP meta-information 421 to the input module 41 and the output module 43. The enabling instruction is received by the guest OS 304 through the same route as the meta-setting instruction. In response to the enabling instruction, the control module 45 in the APP 302 receives the instruction from the guest OS 304, and the control module 45 sets the processes in the APP meta-information 421 to the input module 41 and the output module 43. Moreover, the control module 45 instructs the input module 41 and the output module 43 in which parameters are set to perform a test operation. The input module 41 and the output module 43 performs a test operation (for example, issues a dummy command for testing whether a data set can be read on the basis of the APP meta-information 421) in response to the instruction.

In S509, deployment of the practical NN 423 (and the data check module 422 correlated therewith) is performed. Specifically, for example, the management system 161 transmits a deployment instruction designating the guest address of the deployment destination vacant virtual unit 301. The deployment instruction is an instruction to deploy the practical NN 423 defined in the APP meta-information 421. The deployment instruction is received by the guest OS 304 through the same route as the meta-setting instruction and the enabling instruction. In response to the deployment instruction, the control module 45 in the APP 302 receives the instruction from the guest OS 304, and the control module 45 reads the practical NN 423 on the basis of the APP meta-information 421 (that is, reads the practical NN 423 specified from the APP meta-information 421 from a location specified from the APP meta-information 421), and sets the read practical NN 423 to the APP 302.

In S510, the deployment destination virtual unit 301 is added as a new monitoring target. Specifically, for example, the management system 161 sets the guest address of the deployment destination virtual unit 301 as a new monitoring target guest address (for example, adds the same to the virtual unit monitoring information). The monitoring and recovery performed by the management system 161 (the monitoring unit) is the same as that described above.

In this way, operation of the deployment destination virtual unit 301 (the APP 302 in which the practical NN 423 is set) starts. Specifically, for example, the APP 302 of the virtual unit 301 is executed as the inference unit 114.

While an embodiment of the present invention has been described, this embodiment is an example for describing the present invention, and it is not intended to restrict the scope of the present invention to the embodiment only. The present invention can be executed in various other forms.

For example, the present invention can be applied to a system including modules that perform learning (for example, machine learning) other than deep learning. Therefore, a learning model, a learned model, a practical model, an inference model, and an inference/statistics model may be computation models having a configuration other than NN.

For example, the management system 161 may deploy the practical NN 423 (and the data check module 422) in addition to the APP meta-information 421 to the virtual unit 301.

For example, one or more learning units 102, one or more inference units 114, and the virtual NN host 116 may be present in the same physical computer 201. In other words, each of at least some of the physical computers 201 (one or more physical computers 201) may include one or more learning units 102, one or more inference units 114, and the virtual NN host 116.

For example, when the vacancy ratio of a certain physical computer 201 is equal to or larger than a predetermined vacancy ratio, the management system 161 may transmit a removal instruction designating the guest address of a virtual unit 301 having the APP 302 including an unnecessary main module 42 to the virtual unit 301 instead of or in addition to adding a new physical computer 201. The removal instruction is an instruction to remove the main module 42. The removal instruction is received by the guest OS 304 through the same route as the meta-setting instruction and the enabling instruction. In response to the removal instruction, the control module 45 in the APP 302 receives the instruction from the guest OS 304, and the control module 45 removes the main module 42 from the APP 302. In this way, the virtual unit 301 becomes a vacant virtual unit 301. The control module 45 returns a completion response to the management system 161. The management system 161 updates the virtual unit management information in response to the completion response (specifically, updates the status corresponding to the guest address of the virtual unit 301 from "active" to "standby").

Generally, although individual technologies such as technology related to learning and technologies related to inference are known, a technology that performs processes ranging from learning to inference in a one-stop manner is not known.

The computer system according to the present embodiment can receive a learning data set from external data sources, correlate an annotation results therewith to prepare a teaching data set, perform machine learning of a learning model using the teaching data set, and create a practical model.

This system can receive a practical data set from external data sources, inputs the practical data set to a practical model to execute an inference process, and output an inference result data set indicating the results of the inference process to an external data target.

Therefore, users of this system do not need to perform complex operations such as machine learning (for example, training of a neural network) for preparing a practical model and deployment of the practical model to an inference execution environment by themselves when performing inference (for example, face recognition of persons) using a practical model. Therefore, the use of models such as a neural model in various industrial fields can be facilitated, and progress of a more advanced and convenient information-oriented society can be accelerated.

This system may further include means for storing a practical model separately from the learning unit and the inference unit. The learning unit may input the practical model stored separately and performs additional learning (training) of the practical model. In this way, the practical model can be evolved with improvement of performance and change in a user's request.

Figure 6:
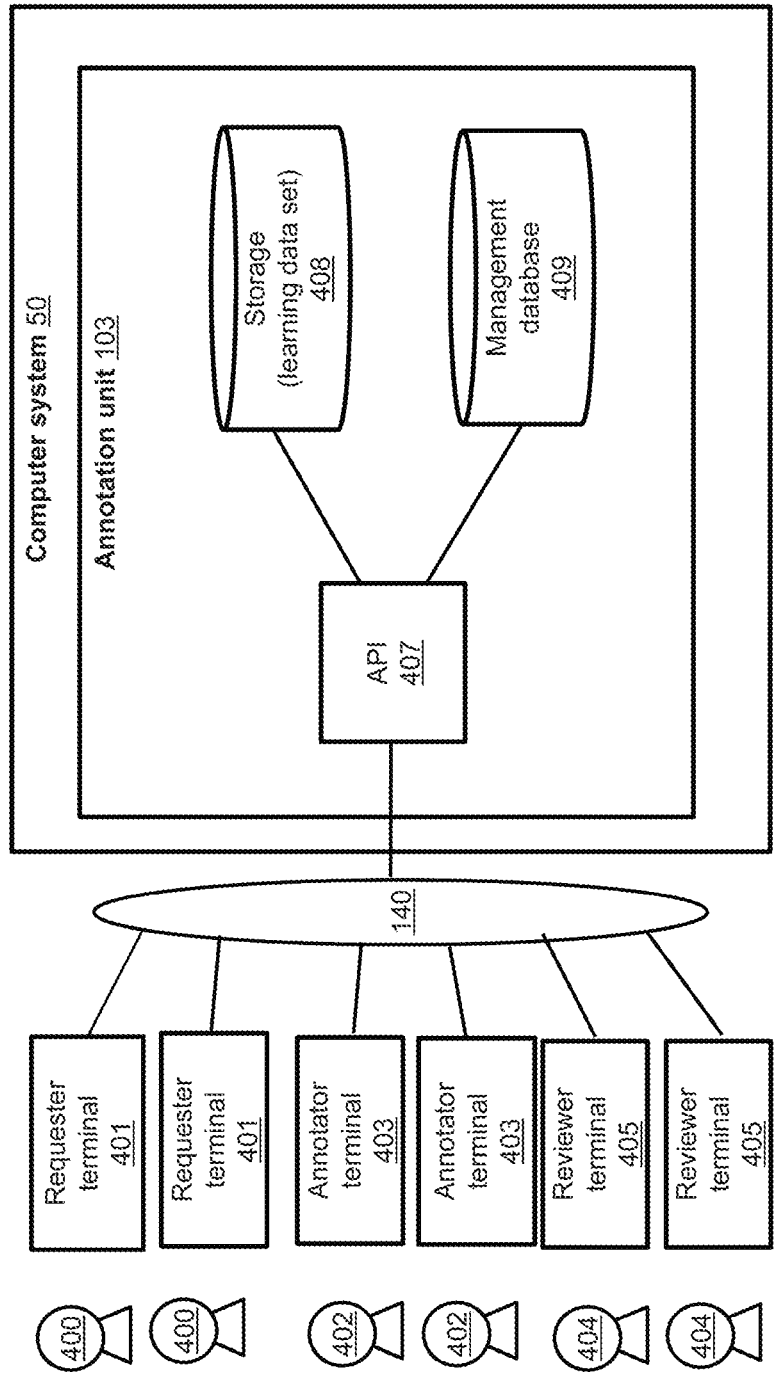
FIG. 6 illustrates a configuration of an annotation unit of a computer system.

Hereinafter, the annotation unit 103 according to the present embodiment will be described in more detail. FIG. 6 illustrates a configuration example of the annotation unit 103.

The annotation unit 103 is provided by the processor unit 253 executing a command set stored in the storage unit 252 of one or more physical computers 201 of the computer system 50 illustrated in FIG. 1, for example.

As illustrated in FIG. 6, the annotation unit 103 can communicate with a plurality of external computers (for example, the plurality of user terminals 112 illustrated in FIGS. 1) 401, 403, and 405 through a communication network 140. The plurality of computers 401, 403, and 405 include one or more requester terminals 401 used by one or more requesters 400, one or more annotator terminals 403 used by one or more annotators 402, and one or more reviewer terminals 405 used by one or more reviewers 404. Here, the requester 400 is a person or an organization who sends a request for an annotation operation to this system 50. The annotator 402 is a person or an organization who performs an annotation operation (that is, inputting an annotation result of learning data). The reviewer 404 is a person or an organization who reviews the annotation result generated by an annotator (for example, determines validity of the annotation result or/and corrects the annotation result as necessary to determine a final annotation result). The annotator 402 (and the reviewer 404 depending on a case) may be so-called a crowd-worker supplied through cloud sourcing, for example.

The annotation unit 103 includes an API 407, a storage 408, and a management database 409. The API 407 communicates with the requester terminal 401, the annotator terminal 403, and the reviewer terminal 405 to transmit and receive information necessary for an annotation operation to and from these computers. An entire part or a part of the API 407 may be included in the input API 106 or the output API 107 illustrated in FIG. 2 or may be prepared separately therefrom.

An entire part or a part of the storage 408 may be included in the data pool 105 or the unstructured storage 104 illustrated in FIG. 2 or may be prepared separately therefrom. A set of learning data which is the target of an annotation operation is stored in the storage 408. The learning data may be data of an arbitrary format such as image data, video data, test data, audio data, or numerical data. The learning data may be unstructured data or structured data. An annotation result of learning data is data which is expected to be output from NN when the learning data was input to the NN, for example. Therefore, teaching data used for learning of NN can be prepared from the learning data and the annotation result thereof.

An entire part or a part of the management database 409 may be included in the data pool 105 or the unstructured storage 104 illustrated in FIG. 2 or may be prepared separately therefrom. Various pieces of data for managing an annotation operation are stored in the management database 409, and an example of a data configuration thereof is illustrated in FIG. 7.

Figure 7:
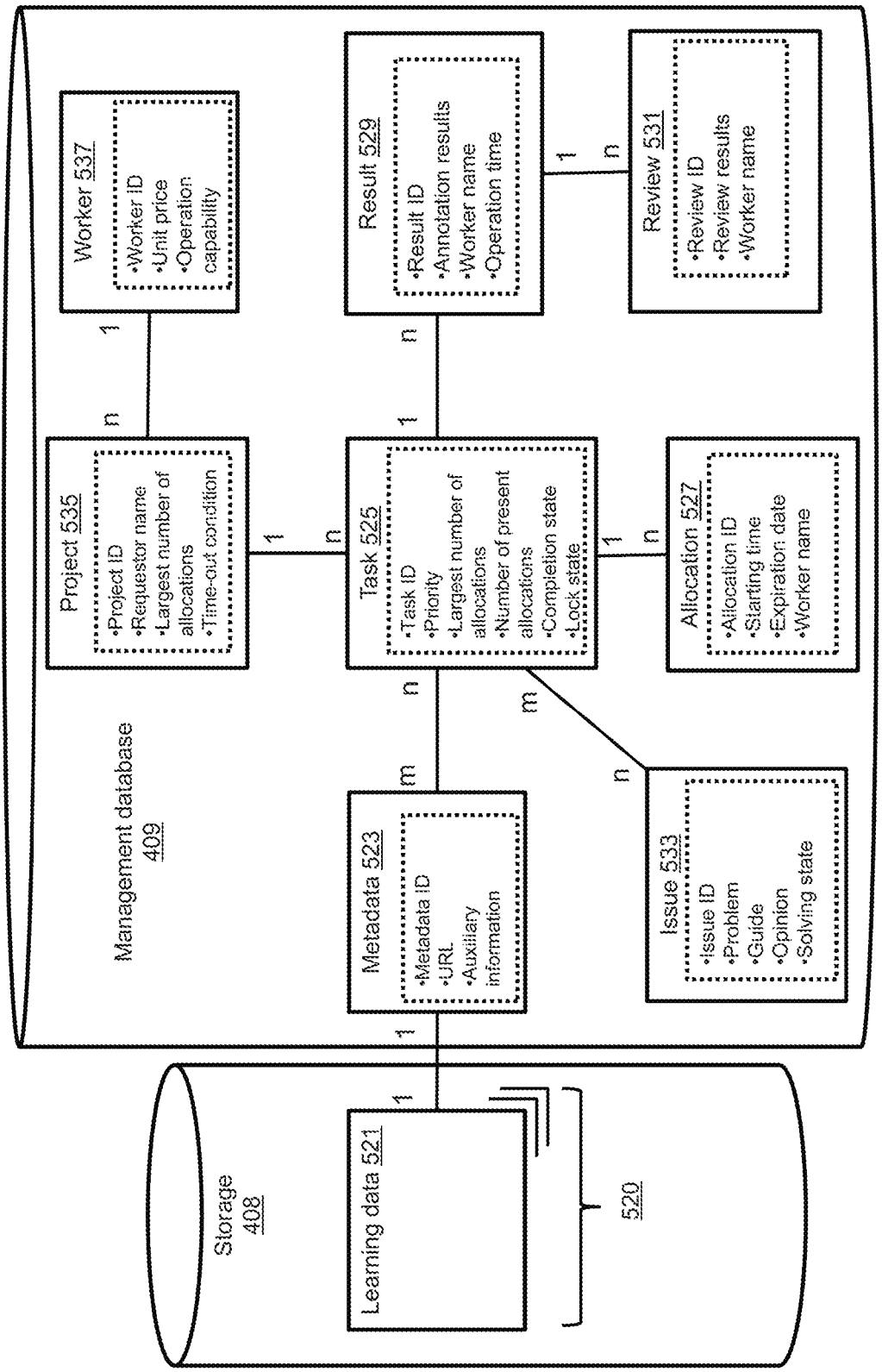
FIG. 7 illustrates a configuration of a management database of an annotation unit.

FIG. 7 illustrates a configuration example of the management database 409.

Different types of data units as below are present in the management database 409.

1) Metadata 523

A learning data set 502 stored in the storage 408 includes a plurality of (generally a number of) units of learning data 521. One unit of metadata 523 is correlated with one unit of learning data 521 in one-to-one correspondence. In one unit of metadata 523, a metadata ID for identifying the metadata and a URI (Uniform Resource Identifier) which is an identification code for uniquely specifying the file of the corresponding one unit of learning data 521 are recorded. By using the URI, it is possible to access the file of the corresponding learning data 521. In one unit of metadata 523, auxiliary information (for example, information related to a date, teaching data, or a data source) related to the corresponding learning data 521 can be also recorded.

2) Task 525

A task 525 is a data unit corresponding to one unit of operation (task) for correlating an annotation result with the learning data 521. In the task 525, a task ID for identifying the task, a priority of the task, a largest number of allocation indicating a largest number of annotators who can allocate the task, a completion state indicating whether the task has been completed, and a lock state indicating whether the task is locked (a new allocation is not possible) are recorded. The priority of the task 525 is useful for controlling the progress of the task. The task 525 is presented to the annotator 402 having received the request for the operation through the annotator terminal 403. One task 525 can be correlated with one or more units of metadata 523. That is, one task can include annotation operations for one or more units of learning data 521. Moreover, one or more tasks 525 can be correlated with the same one unit of metadata 523. That is, a plurality of tasks can be set for the same learning data 521 to obtain annotation results by a plurality of annotators.

3) Allocation 527

An allocation 527 is a data unit corresponding to an allocation of one task 525 to one annotator 402. One of the objectives of the allocation 527 is to control an allocation process so that the same task 525 is not allocated to too many annotators 402 redundantly. In the allocation 527, an allocation ID for identifying the allocation, a starting time and an expiration date of the allocation, and an annotator name for specifying the annotator 402 who has given the allocation (that is, who has acquired the corresponding task) are recorded. When a certain task is allocated to a certain annotator 402, if the expiration date of the allocation 527 expires while an annotation operation corresponding to the task by the annotator 402 is not finished, the allocation is invalidated. As a result, another annotator 402 can acquire the same task. In this way, delay of the task due to negligence of the annotator is prevented. One or more allocations 527 can be correlated with one task 525. That is, one task can be allocated to a plurality of annotators 402. The largest number of allocations described in the task 525 is the upper limit of the number of annotators 402 to which the task can be allocated at the same time.

4) Result 529

A result 529 is a data unit corresponding to an annotation result of one task performed by one annotator 402. In the result 529, a result ID for identifying the result, an annotation result, a worker name for specifying the annotator 402 who has input the annotation result, and an operation time indicating the length of time required for completing the corresponding task after the task is allocated are recorded. When one task is allocated to a plurality of annotators 402, a plurality of results 529 corresponding to the annotation results of the respective annotators 402 are correlated with the one task 525.

Here, the "annotation result" of a certain unit of learning data 521 is information indicating expectation output data expected to be output from a learning model (learning NN) when the unit of learning data 521 is input to the learning model. In many cases, the "annotation result" is a label indicating the classification of the expectation output data. For example, when it is desired to input an image of a certain animal to cause a learning model to learn a method of identifying the kind of the animal, the annotation result of the image is a label such as, for example, "dog" or "cat", indicating the kind of the animal. For example, when it is desired to input an image in which a certain object appears in some region thereof to cause a learning model to learn a method of specifying the region of the object from the image, the annotation result of the image is a paint-out figure or a frame figure which specifies the region of the object, and this figure can be referred to as a "label". Such a classification of the expectation output data specified by the annotation result will be referred to a "label" in the following description. A data format (for example, text, figure, number, image, audio, or the like) of the "label" and the meaning (for example, identification of an object and a person, a spatial or temporal point, a region or a range, judgment or evaluation, and a quantity or a label) of the "label" may be different depending on the characteristics of learning data and the purpose of use of a learning model.

5) Review 531

A review 531 is a data unit corresponding to one reviewer 404 reviewing (determining validity thereof and correcting the same as necessary) one annotation result. In the review 531, a review ID for identifying the review, a review result (for example, determination on whether the annotation result (that is, a label) is valid or a label corrected by the reviewer 404), and a worker name for specifying the reviewer 404 are recorded. One or more reviews 531 can be correlated with the same result 529. That is, the same annotation result can be reviewed by a plurality of reviewers 404. Moreover, instead of or in addition to person-based review, this system 50 may automatically review the annotation result according to a program (for example, one label may be automatically selected as a correct answer from a plurality of different labels for the same learning data 521 by a majority decision).

6 Issue 533

There may be cases where an annotator cannot determine or has difficulty in determining which label is to be assigned to the learning data 521. The issue 533 is a data unit corresponding to an event (issue) which requires such discussion. In the issue 533, an issue ID for identifying the issue, a problem such as a reason reported from the annotator 402 why a label could not to be determined, a guide such as an advice or an instruction presented to the annotator 402 by the requester 400 having received the problem, an opinion presented by the reviewer 404 in response to the guide, and a solving state indicating whether the issue has been solved are recorded. One or more issues 533 can be correlated with one or more tasks 525.

7 Project 535

A project 535 is a data unit corresponding to one annotation operation project. One or more tasks 525 are correlated with one project 535. In the project 535, a project ID for identifying the project, a requester name for specifying a requester, a largest number of allocations of the project, a time-out condition (for example, a largest allowable processing time of task) of the project are recorded. A largest number of allocations of each task included in the project is automatically determined on the largest number of allocations of the project (for example, the largest number of allocations of a project is the same as the largest number of allocations of a task). An expiration date of each allocation of each task included in the project is determined automatically on the basis of a time-out condition of the project (for example, the time obtained by adding the largest allowable processing time to the allocating starting time is the expiration date).

8 Worker 537

A worker 537 is a data unit corresponding to each worker (that is, the annotator 402 and the reviewer 404). In the worker 537, a worker ID for identifying the worker, a unit price of the fee paid for the operation of the worker, an operation capability indicating the capability of the worker (for example, an average operation time required for completing one task) are recorded. The worker 537 can be correlated with one or more projects 535. That is, one worker can participate in a plurality of projects.

Figure 8:
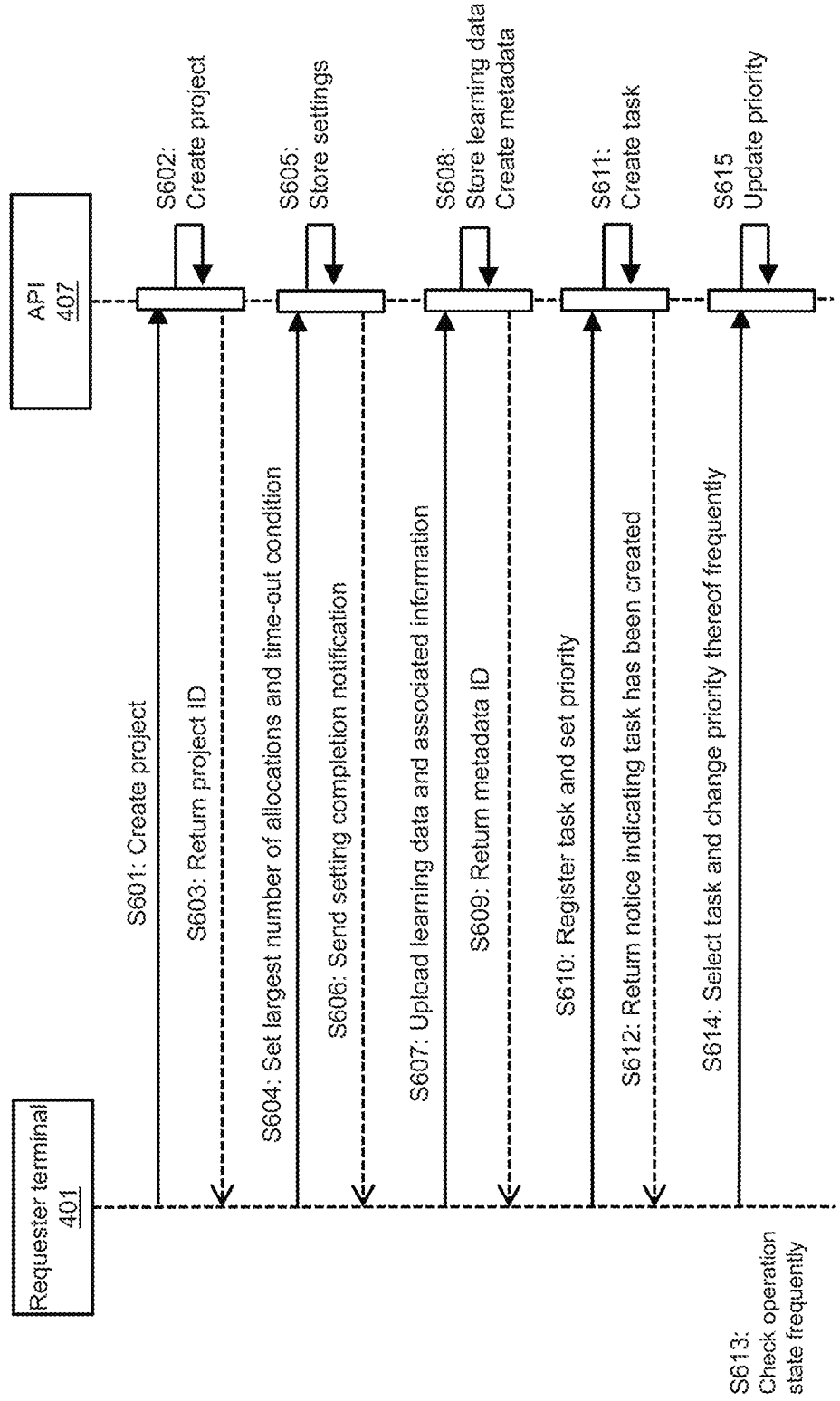
FIG. 8 illustrates a control flow of starting an annotation operation.

FIGS. 8 to 15 illustrate the control flow of the processes of an annotation operation. First, FIG. 8 illustrates the control flow of starting an annotation operation.

In step S601, the requester terminal 401 sends a request to create one new project to the API 407. In response to the request, the API 407 creates the project 535 in S602 and returns the project ID of the created project 535 to the requester terminal 401 in S603. In S604, the requester terminal 401 sets the largest number of allocations and the time-out condition of the project 535 to the API 407. In S605, the API 407 stores the setting of the largest number of allocations and the time-out condition in the project 535. In S606, setting completion notification is sent to the requester terminal 401.

In S607, the requester terminal 401 uploads one or more units of learning data and information associated therewith to the API 407. In S608, the API 407 stores the uploaded learning data 521 in the storage 408 and stores metadata 523 correlated with each unit of learning data 521. In S609, the API 407 returns the metadata IDs of these pieces of metadata 523 to the requester terminal 401.

In S610, the requester terminal 401 sends a request to register one or more tasks to each unit of learning data 521 to the API 407 and sets the priority (the priority requested by the requester or a default priority) of each of the tasks. In response to this, the API 407 creates one or more tasks 525 corresponding to each unit of learning data 521 in S611, and returns a notice that these tasks 525 have been created to the requester terminal 401 in S612.

After that, in S613, the requester terminal 401 can acquire and display an operation state of arbitrary one or more tasks 525 of an arbitrary project 535 from the API 407 frequently and allow the requester 400 to understand the operation state (this process will be described later with reference to FIG. 12). When there is a request to change the priority from the requester 400, the requester terminal 401 request the API 407 to change the priority of the task 525 selected by the requester 400 to a value desired by the requester 400 in S614. In response to this request, the API 407 updates the selected priority of the task 525 in S615.

Figure 9:
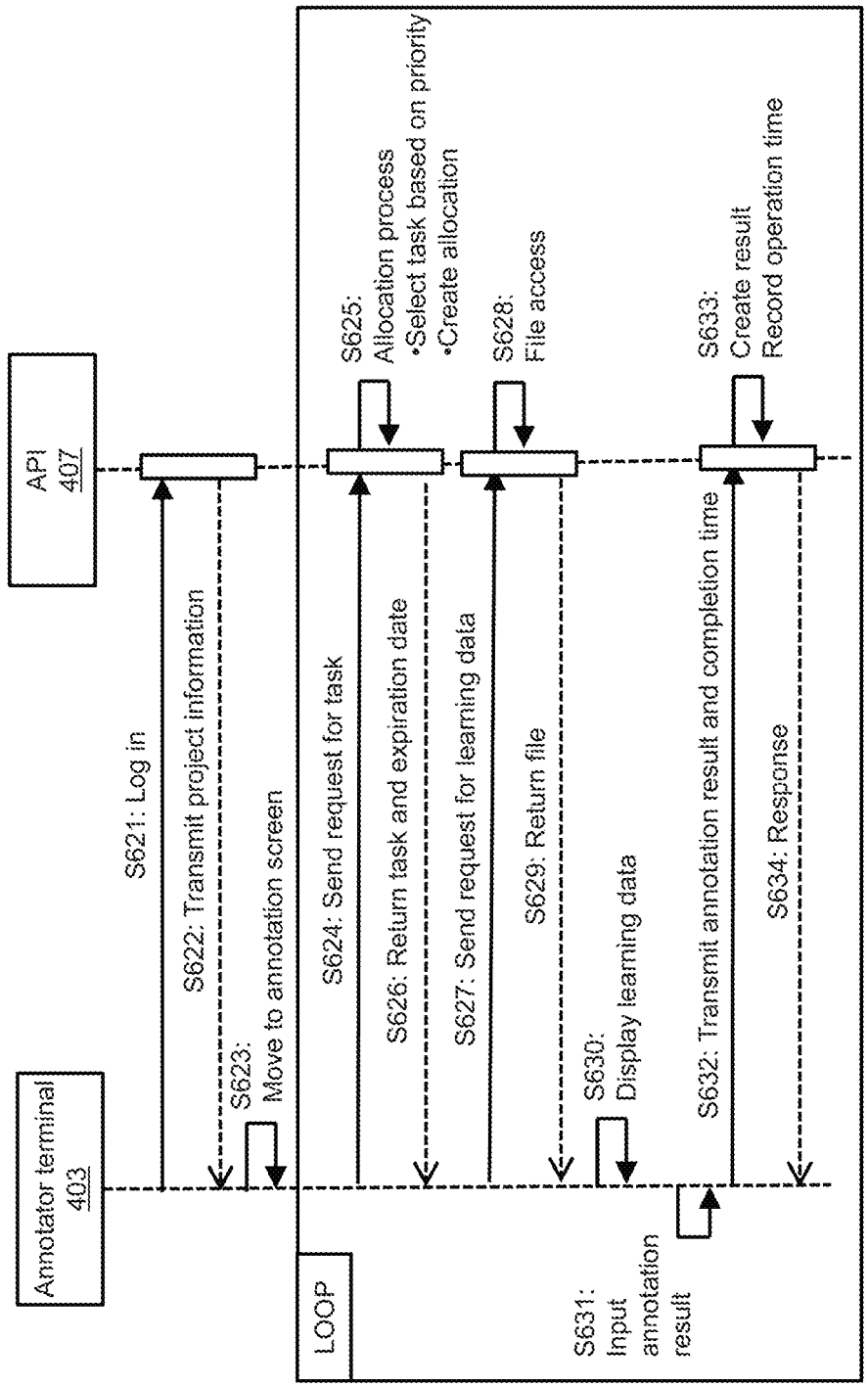
FIG. 9 illustrates a control flow of generation of annotations in an annotation operation.

FIG. 9 illustrates the control flow of generation (that is, labeling) of annotations in an annotation operation.

In S621, a certain annotator 402 sends a login request from the annotator terminal 403 to the API 407. When the login succeeds, the API 407 transmits information indicating existing one or more projects 535 to the annotator terminal 403 in S622. In S623, upon receiving the information, the annotator terminal 403 moves the display from the login screen to an annotation screen for performing an annotation creation operation.

After that, the control of S624 to S634 to be described later is repeated for one or more tasks.

In S624, the annotator terminal 403 selects one project from existing projects and sends a request for at least one task 525 correlated with the selected project 535 to the API 407. In response to this request, the API 407 performs an allocation process in S625. An allocation process is a process of finding out one or more non-completed tasks 525 which have already been allocated to the annotator 402, informing the annotator 402 of the found tasks, and as necessary, allocating new one or more non-completed tasks to the annotator 402. The details of the allocation process will be described with reference to FIG. 10. When a new task is allocated in the allocation process, the API 407 selects a task 525 to be allocated on the basis of the priority of each of the tasks 525 among the non-completed tasks 525 and creates the allocation 527 correlated with the selected task 525. Furthermore, the API 407 determines the expiration date of the allocation 527 on the basis of the time-out condition of the project 535. After the allocation process is performed, the API 407 returns the allocated task 525 and the expiration date of the allocation 527 to the annotator terminal 403 in S627.

In S627, the annotator terminal 403 sends a request for the corresponding learning data 521 to the API 407 using the URI and the access key correlated with the allocated task 525. In S628, in response to this request, the API 407 determines whether it is possible to access the file of the learning data 521 using the URI and the access key. When the determination result is Yes, the API 407 reads the file of the learning data 521 from the storage 408 and returns the file to the annotator terminal 403 in S629. In S630, upon receiving the file, the annotator terminal 403 displays the learning data 521.

In S631, the annotator 402 inputs an annotation result (for example, a label specifying matters that the annotator 402 has determined for the learning data 521) on the displayed learning data 521 to the annotator terminal 403. In S632, the annotator terminal 403 transmits the input annotation and the ending time (for example, the present time) of the task 525 to the API 407. In S633, upon receiving those data, the API 407 creates the result 529 correlated with the task 525 and records an operation time (for example, the length of time from the starting time (allocation time) of the task to the ending time) in the result 529. In S634, the API 407 returns a response indicating that the annotation result has been received to the annotator terminal 403.

Figure 10:
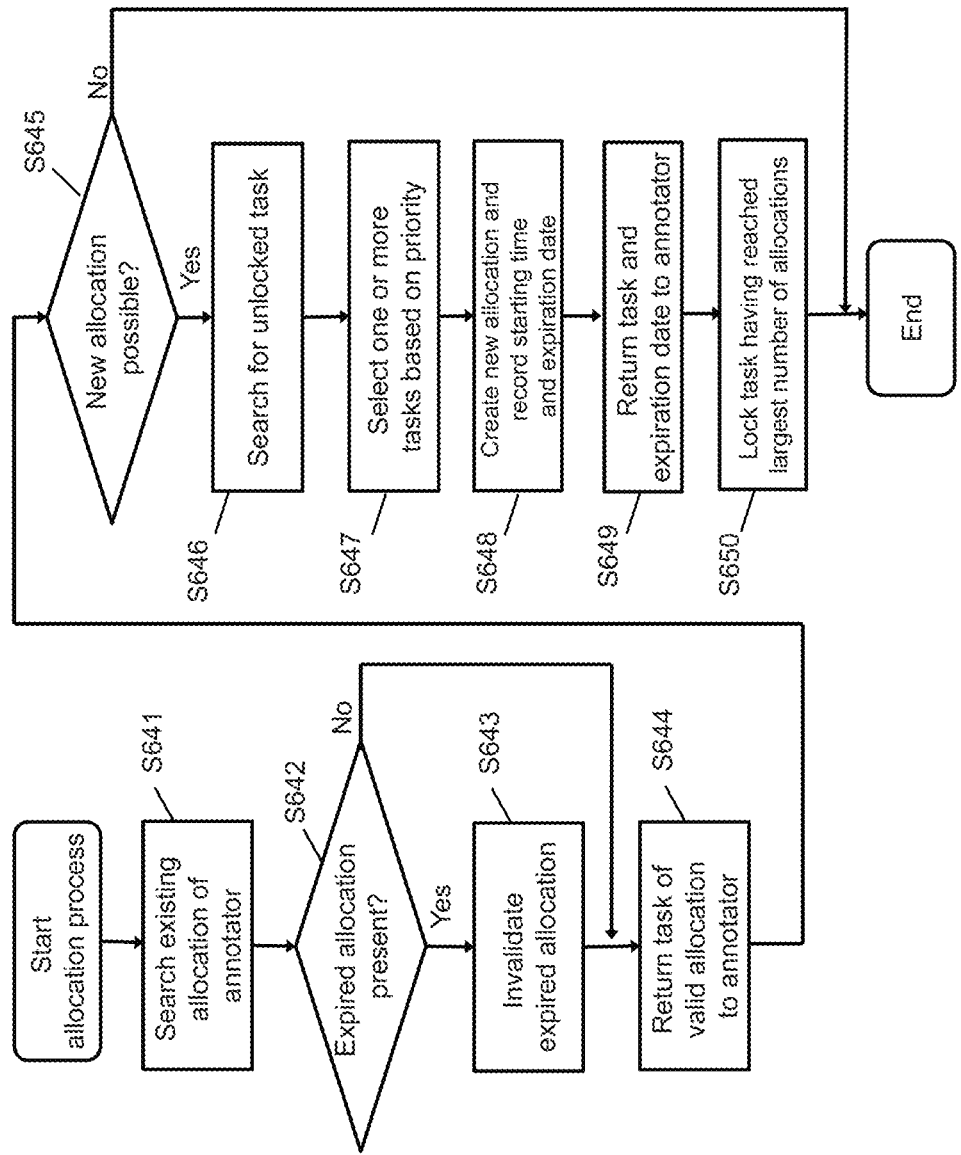
FIG. 10 illustrates a control flow of an allocation process in the flow illustrated in FIG. 9.

FIG. 10 illustrates an example of a control flow of the allocation process (S625) illustrated in FIG. 9.

The existing allocations 527 of the annotator 402 are searched in S641, and it is checked in S642 whether there is an allocation of which the expiration date has expired among these existing allocations 527. When it is determined in S643 that there is an expired allocation 527 of which the expiration date has expired, the allocation is invalidated (that is, removed). When a certain task 525 allocated to the annotator 402 is not completed even if the expiration date has expired, the task can be allocated to another annotator 402 by canceling allocation of the task to the annotator 402. In this way, it is possible to prevent delay of completion of the task 525. In S644, the existing allocation 527 of which the expiration date has not expired is notified to the annotator 644.

In S645, it is checked whether a new task can be allocated to the annotator 402. For example, this checking can be performed on the basis of the capability of the annotator 402, the number of existing non-completed allocations of the annotator 402, and the presence of another allocation request from the annotator 402. When new allocation is not possible, the control of the allocation process ends.

When new allocation is possible, unlocked and non-completed tasks 525 are searched from the existing tasks 525 in S646. In S647, at least one task 525 having a higher priority than the other tasks is selected among the found unlocked and non-completed tasks 525. In S648, an allocation 527 indicating an allocation of the selected task 525 to the annotator 402 is created, and the starting time (for example, the present time) and the expiration date are recorded in the allocation 527. Here, the expiration date is determined, for example, by applying the starting time to the time-out condition (for example, a largest allowable processing time) set to the project 535.

In S649, the task 525 of the new allocation 527 and the expiration date are notified to the annotator 402. When the number of present allocations of the task 525 reaches the largest number of allocations due to the new allocation 527, the task 515 is locked in S650.

With the above-described allocation process, the possibility that a task having a higher priority is processed earlier than other tasks increases. The priority of each task can be changed arbitrarily by the requester 400 as described with reference to FIG. 8, and may be changed automatically as will be described with reference to FIG. 14. The progress of tasks is controlled by controlling the priority of tasks.

In the allocation process described above, an expiration date is set to each allocation, and allocation which is not completed even when the expiration date expires is automatically invalidated so that the same task is allocated to another annotator. In this way, delay of completion of tasks due to negligence of an annotator is prevented. Moreover, a largest number of allocations is set for each task, and the same task can be allocated to a plurality of annotators using the largest number of allocations as the upper limit of the number of annotators. In this way, a plurality of annotators can process the same task to improve the accuracy of annotation results, and it is possible to avoid inefficiency of allocating the same task to many annotators exceeding the largest number of allocations.

Figure 11:
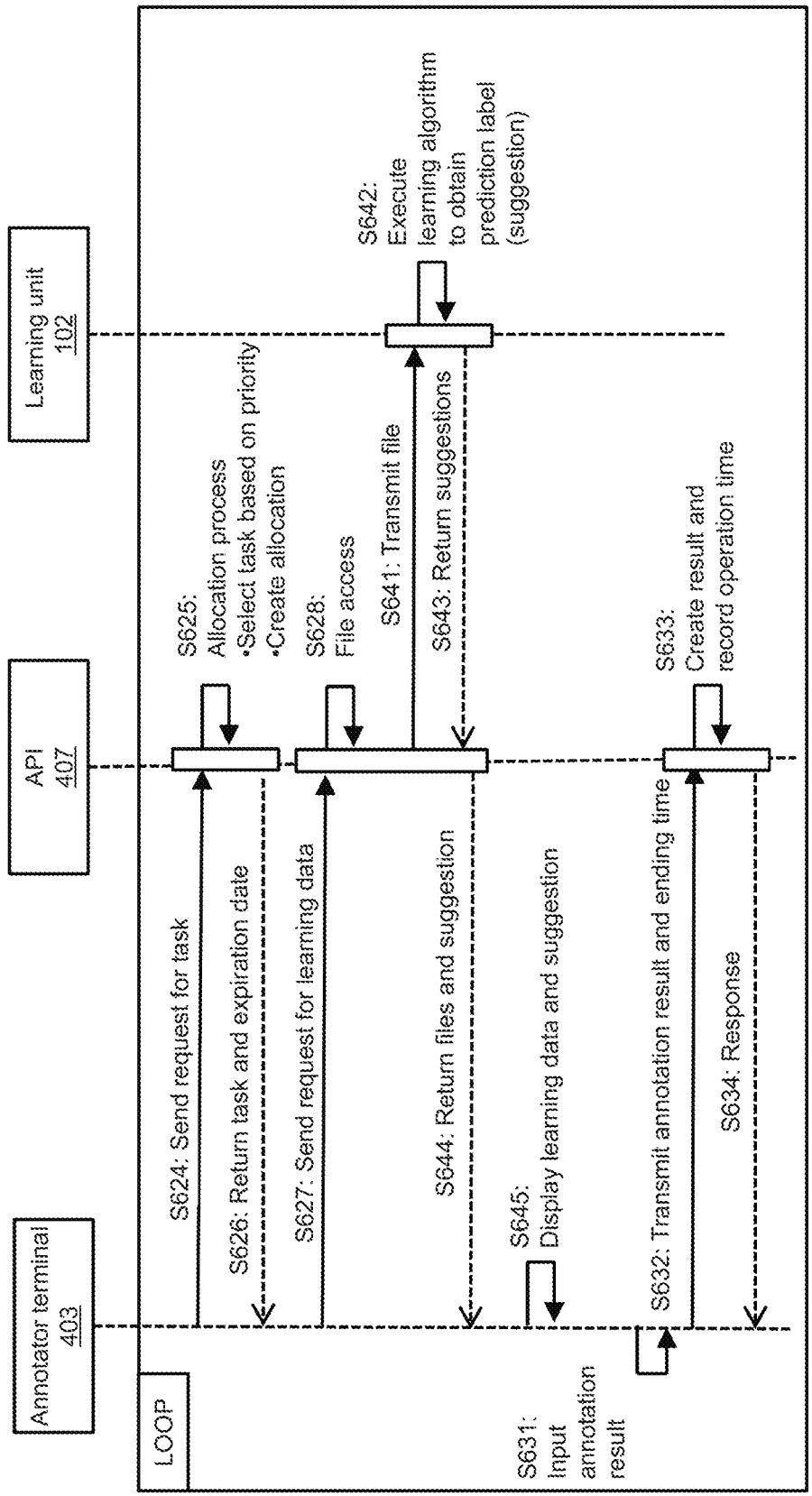
FIG. 11 illustrates a control flow in which a suggestion process is added to the flow illustrated in FIG. 9.

FIG. 11 illustrates a control flow in which the process of suggestion using a learning model is added to the control of the annotation generation operation described with reference to FIG. 9.

Here, a suggestion process is a process in which the learning unit 102 in this system 50 generates an annotation result to be appended (that is, a label suggestion) and presents the same to the annotator 404 in order to help the annotator 402 to facilitate an annotation operation on the learning data 521.

The control of S624 to S628 in FIG. 11 is the same as that illustrated in FIG. 9. In S628, the API 407 reads the file of the learning data 521 and transmits the file to the learning unit 102. In S642, the learning unit 102 having received the file inputs the file to the learning model of the learning unit 102 to executes a machine learning algorithm. In this way, the output data for the learning data 521 from the learning model (that is, a label (hereinafter, prediction label) of the learning data 521 predicted by the learning model) are obtained. The reliability of the prediction label output from the learning model changes depending on the extent of progress of learning of the learning model. When learning has progressed to a certain extent, the output prediction label may be reliable to such an extent that can help the annotator 402. In S643, the learning unit 102 returns the obtained prediction label to the API 407 as a suggestion. In S644, the API 407 returns the files of the learning data 521 and the suggestion to the annotator terminal 403. In S645, the annotator terminal 403 displays the learning data 521 and the suggestion (the identification result output by the learning model). The annotator 402 can refer to the suggestion when determining which label will be assigned to the learning data. The control of S631 to S634 is the same as that illustrated in FIG. 9.

Figure 12:
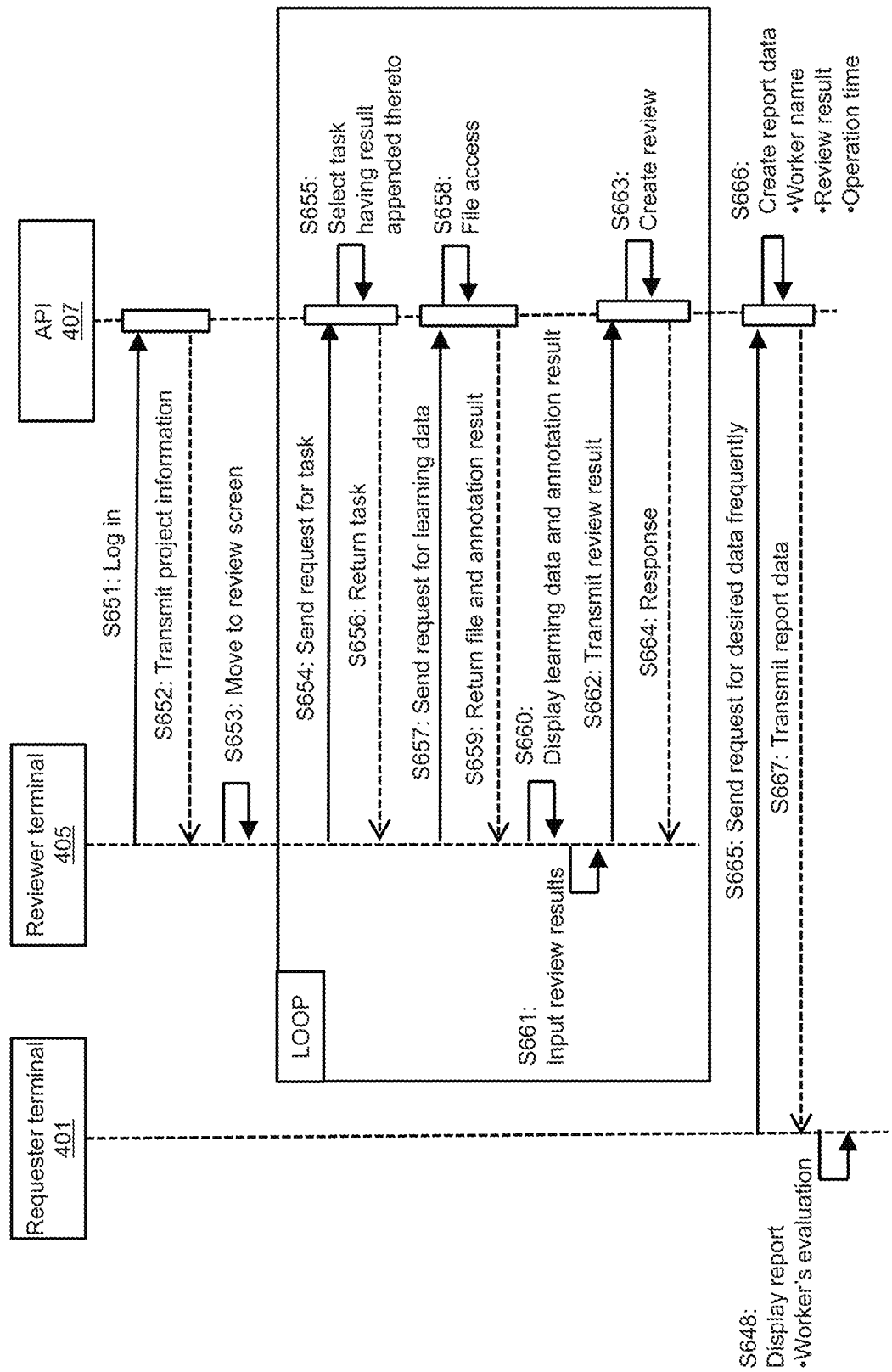
FIG. 12 illustrates a control flow of reviewing of an annotation operation and reporting of the results thereof.

FIG. 12 illustrates a control flow of reviewing of an annotation operation and reporting of the result thereof.

In S651, a certain reviewer 404 sends a login request from the reviewer terminal 405 to the API 407. When the login succeeds, the API 407 transmits information indicating existing one or more projects 535 to the reviewer terminal 405 in S652. In S653, upon receiving the information, the reviewer terminal 405 moves the display from the login screen to a review screen for performing a review operation.

After that, the control of S654 to S664 to be described later is repeated for one or more tasks.

In S654, the reviewer terminal 405 selects one project from existing projects and sends a request for the task 525 correlated with the selected project 535 to the API 407. In response to this request, the API 407 selects at least one task 525 to which one or more results 529 have already been appended in S655 and returns the selected task to the reviewer terminal 405 in S656.

In S657, the reviewer terminal 405 sends a request for the corresponding learning data 521 to the API 403 using the URI and the access key correlated with the selected task 525. In S658, in response to this request, the API 407 determines whether it is possible to access the file of the learning data 521 using the URI and the access key. When the determination result is Yes, the API 407 reads the file of the learning data 521 from the storage 408 and returns the file of the learning data 521 and the annotation result of the result 529 correlated with the task 525 to the reviewer terminal 405 in S659. In S660, upon receiving those data, the reviewer terminal 405 displays the annotation result of the learning data 521.

In S661, the reviewer 404 inputs a review result (for example, a determination on whether the annotation result or the label is valid, or corrections of the label by the reviewer) on the annotation result of the displayed learning data 521 to the reviewer terminal 405. In S662, the reviewer terminal 405 transmits the input review result to the API 407. In S653, upon receiving the data, the API 407 creates a review 531 correlated with the result 529. In S664, the API 407 returns a response indicating that the review result has been received to the reviewer terminal 405.

In S665, the requester terminal 402 can select an arbitrary project at least requested by the terminal and can send a request for information on a desired item (or a fixed item) of the selected project to the API 407. In S666, in response to this request, the API 407 prepares report data of the requested information. In S667, the API 407 returns the report data to the requester terminal 401. In S648, the requester terminal 401 displays the received report data.

Here, the information item that can be included in the report data includes various pieces of data managed by the management database 409 illustrated in FIG. 7, and an example thereof is information on a worker (an annotator or a reviewer). For example, when information on one or more annotators participating in a certain project is requested from the requester terminal 401, the API 407 obtains a processing time (the length of time from the starting time to the ending time) of one or more tasks having been processed up to now by the respective annotators, for example, from the management database 409 and calculates an average value thereof (an average processing time). Moreover, the API 407 obtains the review results having been received up to now by the respective workers from the management database 409 and aggregates the review results (for example, calculates the number of times the annotation results are determined to be valid, the number of times the annotation results are determined to be invalid, and the ratio between the numbers of times). The API 407 edits the processing time of each task, the average processing time, the review results, and the aggregation result of the review results into the report data and returns the same to the requester terminal 401. A requester can evaluate the capabilities of the respective annotators or adjust the amounts of reward of the respective workers, for example, by referring to the report data.

Another example of the information the requester can request is information on a state related to a progress state of a project or the state of a task. For example, when information on all or some tasks included in a certain project is requested from the requester terminal 401, the API 407 obtains the priority of each task, the largest number of allocations, the number of present allocations, the completion state, and the like, for example, from the management database 409, edits the information into the report data, and returns the same to the requester terminal 401. The requester can understand the progress state of each task or the progress state of a project from the report data and can change the priority of each task as necessary. This process corresponds to the processes of S613 to S615 illustrated in FIG. 8.

Figure 13:
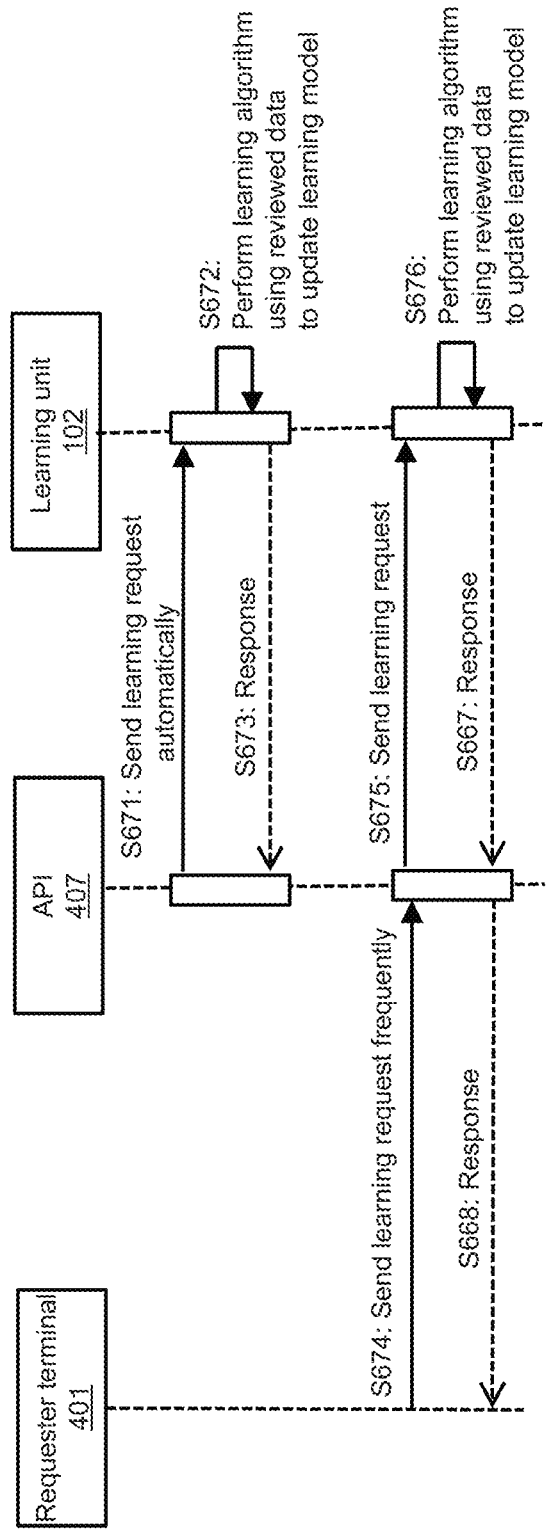
FIG. 13 illustrates a control flow of automated learning performed concurrently with an annotation operation.

FIG. 13 illustrates a control flow of training of a learning model performed automatically concurrently with an annotation operation.

In S671, the API 407 sends a learning request to the learning unit 102 automatically (for example, according to a predetermined time schedule or using a predetermined event such as completion of the review as a trigger). In S672, in response to this request, the learning unit 102 executes a machine learning algorithm (that is, trains a learning model) using one or more annotation results of which the review has been completed at the present time point and one or more units of learning data 521 corresponding thereto. In this way, the learning model of the learning unit 102 is updated. In S673, the learning unit 102 returns a response to the API 407.

In S674, the requester terminal 401 can send a learning request to the API 407. In this case, in S675, the API 407 sends a learning request to the learning unit 102. In S676, in response to this, a machine learning algorithm is executed similar to the above-described control, and the learning model of the learning unit 102 is updated. In S667 and S668, a response is returned from the learning unit 102 to the API 407 and the requester terminal 401.

In this way, machine learning (that is, training) of a learning model is performed concurrently with an annotation operation. Therefore, optimization of a learning model progresses with the progress of an annotation operation. As the optimization of a learning model progresses, the reliability of suggestion described with reference to FIG. 11 increases.

Figure 14:
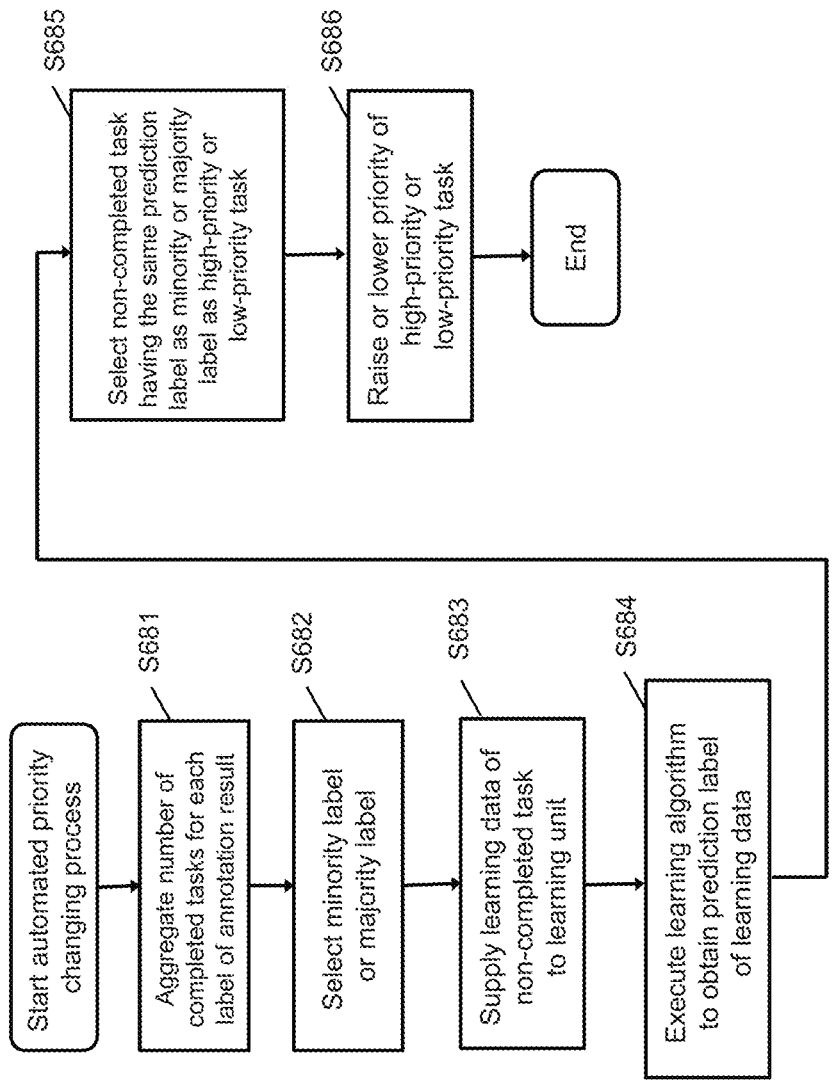
FIG. 14 illustrates a control flow of automatically changing the priority of a task.

FIG. 14 illustrates a control flow of automatically changing the priority of a task.

As described with reference to FIG. 8, the requester 400 can change the priority of an arbitrary task included in his/her project frequently. As can be understood from the flow of an allocation process illustrated in FIG. 10, the higher the priority of a task, the earlier the chance of the task to be allocated to the annotator 402, and as a result, the higher the possibility the task is completed in an earlier stage. In this system 50, the priority of the task can be changed automatically. FIG. 14 illustrates an example of the control of automatically changing the priority. In this system 50, this control is performed by cooperation of the API 407 and the learning unit 102, for example.

In S681, the API 407 aggregates the number of completed tasks of which the reviews have finished at the present time point and the annotation results are determined, for each of labels indicated by the determined annotation results (for example, counts the number of images of each of the labels "dog", "cat", and "monkey" assigned to animal images which are the learning data). In this way, a label-based distribution of the number of completed tasks is determined. In S682, the API 407 selects one or more labels (hereinafter majority labels) of which the number of completed tasks is larger than the other labels and/or one or more labels (hereinafter minority labels) of which the number of completed tasks is smaller than the other labels according to a predetermined rule. The predetermined rule may be set arbitrarily, for example, in such a way as to select labels in which the number of completed tasks is the largest or the smallest, select labels belonging to in a predetermined region of a distribution curve of the number of completed tasks, or select labels in which the ratio between the numbers of completed tasks between labels is higher or lower than a predetermined value.

In S683, the API 407 selects one or more non-completed tasks of which the annotation results have not been determined at the present time point, reads the files of the learning data 521 correlated with the selected non-completed tasks from the storage 408, and provides these files to the learning unit 102. In S684, the learning unit 102 inputs the learning data 521 of the provided non-completed tasks to a learning model to execute machine learning algorithms. In this way, labels (prediction labels) predicted by a learning model with respect to the learning data 521 of the respective non-completed tasks are obtained. When learning of the learning model has progressed to some extent, the obtained prediction labels can be reliable to some extent. The prediction labels obtained for the respective non-completed tasks are returned from the learning unit 102 to the API 407.

In S685, the API 407 selects a non-completed task of which the prediction label is the minority label or the majority label. A non-completed task of which the prediction label is the minority label may be processed earlier than the other tasks. Such a non-completed task will be referred to as a "high-priority task". In contrast, a non-completed task of which the prediction label is the majority label may be processed later than the other tasks. Such a non-completed task will be referred to as a "low-priority task". For example, there are a number of completed tasks in which a number of animal images are assigned with labels of the respective animal names, and the label "dog" is appended to a large number of completed tasks while the label "cat" is appended to very few completed tasks. In this case, tasks labeled with "cat" among the non-completed tasks may be processed preferentially, and tasks labeled with "dog" may be processed later. One or both of such a high-priority task and such a low-priority task is selected in S685.

In S686, the API 407 changes the priority of the non-completed task selected in S685 (for example, raises the priority of the high-priority task or lowers the priority of the low-priority task).

The priority of the non-completed task is controlled automatically according to the distribution of the labels (annotation results) of the completed tasks. This priority control contributes to balancing the distribution of the number of pieces of teaching data obtained by the annotation operation between labels. A set of pieces of balanced teaching data is useful in performing machine learning appropriately.

Figure 15:
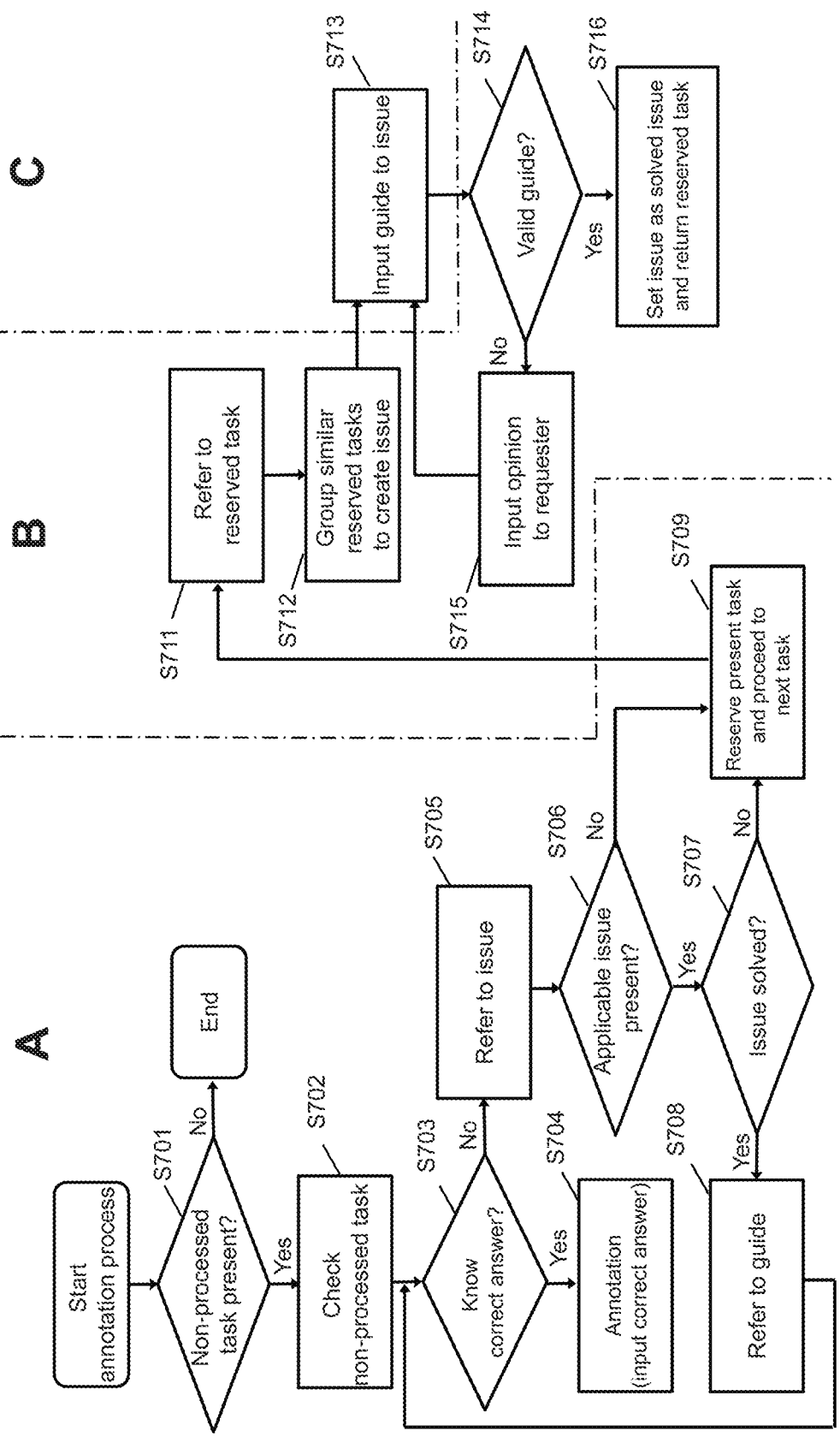
FIGS. 15A 15C illustrate illustrates a control flow of issue management in an annotation operation.

FIG. 15 illustrates a control flow of issue management in an annotation operation.

As described earlier with reference to FIG. 2, an issue is an event requiring discussion such as a case in which an annotator cannot determine or has difficulty in determining which label is to be assigned to the learning data 521. A data unit corresponding to an issue is the issue 533 illustrated in FIG. 2. FIG. 15 illustrates the flow of management and solving of issues. In FIG. 15, the control illustrated in a region A is related to a process that the annotator 402 performs using the annotator terminal 403, the control illustrated in a region B is related to a process that the reviewer 404 performs using the reviewer terminal 405, and the control illustrated in a region C is related to a process that the requester 400 performs using the requester terminal 401.

As illustrated in FIG. 15, in S701, the annotator 402 searches for a non-processed task which has not yet been subjected to annotation among the tasks allocated thereto using the annotator terminal 403. This corresponds to the control of S624 to S626 illustrated in FIG. 9 and the control of an annotation operation illustrated in FIG. 10. When a non-processed task is not found, the issue management control ends.

When a non-processed task is found, the annotator 402 performs the non-processed task (displays the learning data 521 and checks the labels which can be appended) in S702 and determines a correct answer label in S703. When a correct answer label is known, the annotator 402 inputs the correct answer label (that is, an annotation result) in S704. This corresponds to the control of S627 to S631 illustrated in FIG. 9.

When a correct answer label is not known, the annotator 402 sends a request to the API 407 from the annotator terminal 403 to list up the issues 533 related to the same project 535 present at the present time point and refers to the content of these issues 533 in S705. In S706, the annotator 402 finds an issue applicable to the present task among the listed-up issues 533. For example, if there is an issue correlated to the same or similar task, the issue is considered to be applicable.

When an applicable issue 533 is found, the annotator 402 checks whether the issue 533 has been solved in S707. If the issue has been solved, the issue 533 includes a guide which is an instruction or an advice from the requester 400 related to how annotation is to be performed (that is, how a correct answer label is to be determined). Therefore, the annotator 402 refers to the guide in S708 and returns to S703 to examine a correct answer label again.

When an applicable issue 533 is not found in S706 or when the applicable issue has not been solved in S707 (that is, when a guide has not been input), the annotator 402 performs a predetermined operation (for example, reserves the task) on the present task and proceeds to the next task in S709.

In S711, the reviewer 404 accesses the API 407 from the reviewer terminal 405 to list up reserved tasks and refers to the content of the reserved tasks. In S712, the reviewer 404 classifies the listed-up reserved tasks into one or more groups made up of similar reserved tasks and creates an issue 533 correlated with each of the groups (that is, similar reserved tasks).

In S713, the requester 400 accesses the API 407 from the requester terminal 401 to list up issues 533 related to the project thereof and inputs a guide to the respective issues 534.

In S714, the reviewer 404 accesses the API 407 from the reviewer terminal 405 to refer to the content of the issue 533 related thereto and checks the validity (for example, whether the guide is clear to an extent that the annotator can determine a correct answer label) of the guide input to the respective issue 533. When it is determined that the guide is valid, the reviewer 404 inputs an opinion on the guide to the issue 533 and requests the requester 400 to correct the guide in S715. When it is determined that the guide is valid, the reviewer 404 sets the issue 533 as a solved issue and returns all reserved tasks correlated with the issue 533 to the respective annotators 402 in S716 (that is, cancels the reserved state so that the reserved tasks are restored to normal non-processed tasks). In this way, the annotator 402 having reserved a certain non-processed task can resume an annotation operation subsequent to S702 on the non-processed task in S709.

Due to such issue management, an annotation result based on erroneous determination and ambiguous determination decreases and the quality of teaching data for machine learning is improved.

While some embodiments of the present disclosure have been described, these embodiments are simple examples for understanding of the present disclosure, and it is not intended to restrict the scope of the present invention to these embodiment only. The present disclosure can be performed in various other structures and method different from the above-described embodiment.

REFERENCE SIGNS LIST

100 Learning and inference support system

The invention claimed is:

1. A computer system comprising:
at least one physical computer including:
at least one processor:
at least one storage device capable of storing a command set executed by the at least one processor and storing data that can be processed by the at least one processor; and
at least one interface connected to the at least one processor and at least one communication network,
wherein the at least one processor is configured to execute:
preparing one or more learning models;
inputting learning data from at least one data source through the at least one interface to store the input learning data in the at least one storage devices;
generating one or more learned models by performing machine learning of the one or more learning models using the learning data;
determining at least one practical model on the basis of the one or more learned models;
inputting practical data from at least one data source through the at least one interface;
executing inference based on the at least one practical model using the practical data;
transmitting inference result data output from the at least one practical model by the inference to at least one data target through the at least one interface;
one or more vacant virtual units, each vacant virtual unit including an input module and an output module; and
preparing at least one occupied virtual unit by incorporating the at least one practical model in at least one of the at least one vacant virtual unit, and the at least one occupied virtual unit is configured to execute:
inputting the practical data to the at least one practical model through the input module to execute the inference based on the at least one practical model;
outputting the inference result data output from the at least one practical model by execution of the inference from the occupied virtual unit; and
transmitting the inference result data output from the occupied virtual unit to at least one data target through the at least one interface.

2. The computer system according to claim 1, wherein each of the input module and the output module in the vacant virtual unit is a general-purpose module having a configuration that does not depend on a practical model incorporated in the vacant virtual units.

3. The computer system according to claim 2, wherein the at least one processor is configured to execute:
setting meta-information related to the at least one occupied virtual unit, the meta-information including parameters related to an operation of at least one general-purpose module of the input module and the output module;
setting the parameters to the at least one general-purpose module on the basis of the meta-information; and
operating the at least one general-purpose module on the basis of the set parameters.

4. The computer system according to claim 1, wherein the at least one processor is configured to execute:
setting meta-information related to the at least one occupied virtual unit, the meta-information including information indicating attributes of the at least one practical model, and the attributes including identification information and a location of the at least one practical model; and
incorporating the at least one practical model in the at least one virtual unit on the basis of the meta-information.

5. The computer system according to claim 1, wherein the at least one processor is configured to execute:
initially preparing a predetermined number of two or more vacant virtual units; and
changing the number of occupied virtual units within the range of the predetermined number or smaller without requiring restarting of the physical computer.

6. The computer system according to claim 1, wherein the at least one processor is configured to execute:
examining accuracy of the one more learned models; and
determining the at least one practical model on the basis of the accuracy of the one or more learned models.

7. The computer system according to claim 1, wherein the at least one processor is configured to execute:
examining accuracy of the one more learned models; and
selecting at least one learned model among the one or more learned models on the basis of the accuracy of the one or more learned models and performing additional machine learning of the selected learned model.

8. The computer system according to claim 1, wherein the at least one processor is configured to execute:
performing a statistic process using at least one of the practical data and the inference result data.

9. The computer system according to claim 1, wherein the at least one processor is configured to execute:

transmitting the learning data to at least one annotator terminal through the at least one interface;
receiving an annotation result related to the learning data from the at least one annotator terminal through the at least one interface;
storing the received annotation result in the at least one storage device in correlation with the learning data; and
performing the machine learning of the one or more learning models using the learning data and the annotation result correlated therewith as teaching data.

10. A method performed by a computer system, comprising the steps of:
preparing one or more learning models;
inputting learning data from at least one data source;
generating one or more learned models by performing machine learning of the one or more learning models using the input learning data;
determining at least one practical model on the basis of the one or more learned models;
executing one or more vacant virtual units, each vacant virtual unit including an input module and an output module;
preparing at least one occupied virtual unit by incorporating the at least one practical model in at least one of the at least one vacant virtual unit; and
by the at least one occupied virtual unit,
   inputting practical data from at least one data source to the at least one practical model through the input module, to execute inference based on the at least one practical model using the input practical data,
   outputting inference result data output from the at least one practical model by execution of the inference from the at least one occupied virtual unit, and
   transmitting the inference result data output from the occupied virtual unit to at least one data target through at least one interface connected to at least one communication network.

11. A computer system comprising:
at least one processor;
at least one storage device capable of storing a command set executed by the at least one processor and storing data that can be processed by the at least one processor; and
at least one interface connected to the at least one processor and at least one communication network,
wherein the at least one processor is configured to execute:
   preparing one or more learning models;
   inputting at least one unit of learning data from at least one data source through the at least one interface to store the input learning data in the at least one storage device;
   creating a plurality of tasks correlated with each of a plurality of units of learning data;
   setting a priority to each of the plurality of tasks;
   selecting tasks among the plurality of tasks in an order corresponding to the priority;
   allocating the selected tasks to at least one annotator terminal;
   transmitting at least one unit of learning data correlated with the allocated tasks to the at least one annotator terminal through the at least one interface;
   receiving an annotation result related to the at least one unit of learning data from the at least one annotator terminal through the at least one interface;
   storing the received annotation result in the at least one storage device in correlation with each of the at least one unit of learning data; and
   generating one or more learned models by performing machine learning of the one or more learning models using the at least one unit of learning data and the at least one annotation result correlated therewith.

12. The computer system according to claim 11, wherein the at least one processor is configured to execute:
changing the priority of the plurality of tasks according to a distribution of the annotation results related to the plurality of tasks.

13. The computer system according to claim 11, wherein the at least one processor is configured to execute:
setting a largest number of allocations;
allocating at least one task among the plurality of tasks to a plurality of annotator terminals equal to or smaller than the largest number of allocations;
transmitting at least one unit of learning data correlated with the at least one task to the plurality of annotator terminals to which the at least one task is allocated;
receiving a plurality of annotation results related to the at least one unit of learning data from the plurality of annotator terminals; and
storing the plurality of received annotation results in the at least one storage device.

14. The computer system according to claim 11, wherein the at least one processor is configured to execute:
calculating an operation time required for the at least one annotator terminal to create the at least one annotation result of the at least one learning data; and
transmitting information on the operation time calculated for the at least one annotator terminal to at least one another terminal.

15. The computer system according to claim 11, wherein the at least one processor is configured to execute:
creating an issue related to an allocated one of the selected tasks when the at least one annotator terminal performs a predetermined operation on the allocated task;
transmitting the created issue to at least one another terminal;
receiving a guide related to the issue from the at least one another terminal; and
transmitting the received guide to the at least one annotator terminal.

16. The computer system according to claim 11, wherein the at least one processor is configured to execute:
inputting at least one unit of learning data transmitted to the at least one annotator terminal to the at least one learning model;
receiving output data output from the at least one learning model to which the at least one unit of learning data is input to prepare a suggestion related to the at least one unit of learning data; and
transmitting the suggestion related to the at least one unit of learning data to the at least one annotator terminal.

17. A computer system comprising:
at least one processor;
at least one storage device capable of storing a command set executed by the at least one processor and storing data that can be processed by the at least one processor; and
at least one interface connected to the at least one processor and at least one communication network, wherein the at least one processor is configured to execute:

preparing one or more learning models;

inputting at least one unit of learning data from at least one data source through the at least one interface to store the input learning data in the at least one storage device;

creating at least one task correlated with the at least one unitof learning data;

allocating the at least one task to at least one annotator terminal;

transmitting at least one unit of learning data correlated with the allocated at least one task to the at least one annotator terminal through the at least one interface;

setting an expiration date to allocation of the at least one task to the at least one annotator terminal;

invalidating the allocation when an annotation result related to the allocation has not been received from the at least one annotator terminal and the expiration date of the allocation has expired so that the same at least one task is allocated again to another at least one annotator terminal;

receiving at least one annotation result related to each of the at least one unit of learning data from the at least one annotator terminal through the at least one interface;

storing the received at least one annotation result in the at least one storage device in correlation with each of the at least one unit of learning data; and generating one or more learned models by performing the machine learning of the one or more learning models using the at least one unit of learning data and the at least one annotation result correlated therewith.

18. A method performed by a computer system, comprising the steps of:

preparing one or more learning models;

inputting at least one unit of learning data from at least one data source;

creating a plurality of tasks correlated with each of a plurality of units of learning data;

setting a priority to each of the plurality of tasks;

selecting tasks among the plurality of tasks in an order corresponding to the priority;

allocating the selected tasks to at least one annotator terminal;

transmitting the at least one unit of learning data correlated with the allocated tasks to the at least one annotator terminal;

receiving an annotation result related to the at least one unit of learning data from the at least one annotator terminal;

storing the received annotation result in correlation with each of the at least one unit of learning data; and performing machine learning of the one or more learning models using the at least one unit of learning data and the annotation result correlated therewith as teaching data.

* * * * *